(12) United States Patent
Funk

(10) Patent No.: US 7,363,500 B2
(45) Date of Patent: Apr. 22, 2008

(54) TUNNELED AUTHENTICATION PROTOCOL FOR PREVENTING MAN-IN-THE-MIDDLE ATTACKS

(75) Inventor: Paul Funk, Cambridge, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 872 days.

(21) Appl. No.: 10/728,360

(22) Filed: Dec. 3, 2003

(65) Prior Publication Data

US 2005/0125663 A1 Jun. 9, 2005

Related U.S. Application Data

(60) Provisional application No. 60/430,398, filed on Dec. 3, 2002.

(51) Int. Cl.
*H04L 9/28* (2006.01)
*H04L 9/00* (2006.01)

(52) U.S. Cl. .................. 713/180; 380/30; 713/176
(58) Field of Classification Search .................. 713/180
See application file for complete search history.

(56) References Cited

U.S. PATENT DOCUMENTS

| 5,666,415 A | | 9/1997 | Kaufman | |
|---|---|---|---|---|
| 5,751,812 A | * | 5/1998 | Anderson | 713/155 |
| 6,341,273 B1 | * | 1/2002 | Briscoe | 705/41 |
| 6,851,049 B1 | * | 2/2005 | Price, III | 713/150 |
| 6,901,512 B2 | * | 5/2005 | Kurn et al. | 713/164 |
| 6,944,765 B1 | * | 9/2005 | Rose et al. | 713/181 |
| 7,158,637 B2 | * | 1/2007 | Ohta et al. | 380/37 |
| 7,194,618 B1 | * | 3/2007 | Suominen | 713/155 |
| 2003/0016823 A1 | * | 1/2003 | Chung | 380/46 |
| 2004/0123102 A1 | * | 6/2004 | Gehrmann et al. | 713/161 |

FOREIGN PATENT DOCUMENTS

WO WO 0048358 A1 8/2000

OTHER PUBLICATIONS

Funk, "EAP Tunneled TLS Authentication Protocol (EAP-TTLS)", www.ietf.org, draft-ietf-pppext-eap-ttls-02.txt (Nov. 2002), pp. 1-40.
Asokan, et al., "Man-in-the-Middle in Tunneled Authentication Protocols", (Nov. 11, 2002), pp. 1-15.

(Continued)

*Primary Examiner*—Matthew Heneghan
(74) *Attorney, Agent, or Firm*—Shumaker & Sieffert P.A.

(57) ABSTRACT

Systems and methods for preventing a Man-in-the-Middle attack on a communications network, without combining encryption keys of an inner authentication protocol and a tunneling protocol encapsulating the inner authentication protocol. The performance of a hash function may be split between two network devices on the communications network. For example, in response to a challenge issued by a tunnel server, a client may initiate performance of a hash function using only a first part only of the challenge and generate an intermediate result of the hash function (i.e., a preliminary hash). The client then may transmit the preliminary hash to the tunnel server as part of a response to the challenge. The tunnel server then may complete the hash function using the preliminary hash and the remaining part of the challenge to produce a final hash. The final hash then may be used to authenticate a user.

84 Claims, 13 Drawing Sheets

OTHER PUBLICATIONS

Puthenkulam, et al., "The Compound Authentication Binding Problem", www.ietf.org, draft-puthenkulam-eap-binding-04.txt (Oct. 27, 2003), pp. 1-35.

International Search Report from International Application No. PCT/US03/38527, filed Dec. 3, 2003.

Rivest et al., *How to Expose an Eavesdropper*, Communications of the ACM, vol. 27, No. 4, Apr. 30, 1984, XP002281011.

* cited by examiner

TUNNELED AUTHENTICATION PROTOCOL FOR PREVENTING MAN-IN-THE-MIDDLE ATTACKS

RELATED APPLICATIONS

This application claims the benefit under 35 U.S.C. §119(e) to commonly-owned U.S. provisional patent application Ser. No. 60/430,398, entitled THE EAP-MD5 TUNNELED AUTHENTICATION PROTOCOL, filed on Dec. 3, 2002 under attorney docket no. F0232.70000US00, which is hereby incorporated by reference in its entirety.

BACKGROUND

Communications networks (e.g., the Internet) continue to have a growing role in today's world. As used herein, a "network" or a communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, electromagnetic (e.g., wireless) transmission or any combination of these transmission media. As used herein, "plurality" means two or more. As used herein, a "network device" is a device operative to communicate on a network, including, but not limited to: workstations, personal computers, terminals, laptop computers, end stations, servers, gateways, registers, switches, routers, hubs, bridges, directories, transmitters, receivers, repeaters, and any combinations thereof. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth with respect to claims, in the United States Patent and Trademark Office Manual of Patent Examining Procedures (Original Eighth Edition, August 2001), Section 2111.03.

As the roles of networks continue to expand, network security becomes increasingly critical. A common form of network security is user authentication, in which users must authenticate their identities to a network before being allowed access to the network or certain network resources available on the network. As used herein, an "authentication protocol" is a protocol (i.e., a set of rules and procedures) for authenticating a user to a network. A common form of user authentication is password-based authentication, in which an authentication server issues a challenge to the user (e.g., prompts the user for user credentials), and the user responds with user-authenticating information (e.g., credentials such as a username and password). Typically, the user-authenticating information as supplied by the user is encrypted. As used herein, an "authentication server" is a logical entity residing on a network device, which is operative to authenticate a user for access to a network. As used herein, a "challenge" is information transmitted from a first network device to a second network device, as part of an authentication process, prompting the second network device to issue a response (e.g., including one or more user credentials) to be authenticated.

Most password-based authentication protocols are inherently of low security due to the fact that passwords are typically of low entropy. Such protocols are susceptible to "dictionary" (i.e., password-guessing) attacks mounted by an eavesdropping attacker. Such password-based authentication protocols include Challenge Handshake Authentication Protocol (CHAP), Extensible Authentication Protocol-Message Digest 5 Challenge (EAP-MD 5 Challenge or MDC), Microsoft's MS CHAP and EAP-GenericToken-Card. Other authentication protocols use more secure encryption techniques that involve the use of encryption keys. Such authentication protocols include Extensible Authentication Protocol GSM Subscriber Identity Module (SIM).

To further secure communications between two network devices, tunneling protocols have been developed. As used herein, a network "tunnel" is a secure transmission path established across one or more networks between a first network device and a second network device, such that the first and second network devices can exchange communications along the path, and the contents thereof (except for information necessary for proper switching and routing) is secured against ascertainment by any entity except the first and second network devices. "Tunneling" refers to the establishing and maintaining of a tunnel, and the transmission of communications within a tunnel. A "tunneling protocol" is a protocol for implementing a tunnel. A common example of the use of a tunnel is to establish a Virtual Private Network (VPN) across a public network (e.g., the Internet) between a user device and a remote access server, for example, a Remote Authentication Dial-In User Service (RADIUS) server, of a private network such as a corporate Local Area Network (LAN).

Tunneling protocols use more sophisticated encryption techniques and typically use public/private key cryptography to establish encryption keys that allow subsequent transmissions to be secure against eavesdroppers Typically, at least one of the network devices that terminate (i.e., serve as an endpoint for) the tunnel certifies its identity to the other network device using a certificate or other credentials; both devices may separately authenticate. After the identities of one or both of the network devices is certified (such that each certified device is "trusted" by the other device), the tunnel is created and secure communications are exchanged within the tunnel between the two network devices. There are a variety of tunneling protocols, including Extensible Authentication Protocol Tunnel Transport Layer Security (EAP-TTLS or TTLS) and Extensible Authentication Protocol-Protected Extensible Authentication Protocol (EAP-PEAP or PEAP). TTLS and PEAP both are based on tunnels created via Transport Layer Security (TLS) technology, which was formerly known as Secure Sockets Layer (SSL). An authentication protocol may be encapsulated within a tunnel established by a tunneling protocol, in order to secure the authentication protocol against eavesdropping attacks. As used herein, an "inner protocol" or "tunneled protocol" means an authentication protocol transmitting and/or receiving communications within a tunnel provided by a tunneling protocol.

FIG. 1 is a block and information flow diagram illustrating an example of a known system 100 for encapsulating inner protocol communications within a tunnel provided by a tunneling protocol. System 100 includes client 102 and tunnel server 112.

As used herein, a "client" is a logical entity associated with a user, residing on a network device, serving as an endpoint to a tunnel and operative to generate and transmit a response to a challenge on behalf of the user. The network device on which the client resides may be used by the user to access a network, for example, by communicating with a remote access server of the network. The network device on which the client resides may be a user device, for example, a workstation, terminal, personal computer, laptop computer, telephone, pager, BlackBerry™ brand device, personal digital assistant (PDA), or any combination thereof or other device that can provide client functionality. As used herein, a "tunnel server" is a logical entity, residing on a network device different than the network device on which the client resides, serving as an endpoint to a tunnel and operative to generate and transmit a challenge.

Tunnel server 112 issues a challenge 108 in accordance with an inner protocol to client 102. In response, a hash generator 104 of client 102 generates a response 110 to the challenge and the client transmits the response 110 to tunnel server 112. Tunnel server 112 and client 102 serve as endpoints (i.e., terminals) for a tunnel 106 that encapsulates communications (e.g., challenge 108 and response 110) between the client 102 and tunnel server 112. The inner protocol may be any suitable protocol such as (but not limited to) any of a variety of legacy authentication protocols, for example, an MD5-based authentication protocol, such as CHAP or MDC. As used herein, a "MD5-based protocol" is an authentication protocol that uses an MD5 algorithm or variation thereof to exchange information, and an MD5-based hash function is an MD5 hash function or variant thereof.

FIG. 2 is a flowchart illustrating an example of a known method 200 of authenticating a user according to an MD5 algorithm.

In Act 202, an MD5 challenge is generated for the user. Such challenge may be generated on an authentication server (e.g., 126) or on an intermediate server, for example, a tunnel server (e.g., 112) between the client (e.g., 102) and authentication server. Such challenge may be a random challenge of variable length.

In Act 204, a first communication is transmitted to the client, the first communication including the MD5 challenge. Such communication may be transmitted directly from the authentication server or through an intermediate server.

In a following Act 206, the following information is concatenated in the following order: the MD5 authentication protocol identifier, the user's password, the MD5 challenge, a single octet of hexadecimal value 80, padding octets and eights octets indicating a message length to produce an MD5 hash function input sequence. The number of padding octets is configured such that the length of the MD5 hash function input sequence is a multiple of 64 octets. The "message" is the concatenation of the authentication protocol identifier, the user's password and the MD5 challenge, such that the message length indicates the length of this concatenation.

In Act 208, an MD5 hash value (i.e., message digest or hash) is generated using MD5 hash function input sequence, for example, as illustrated in FIG. 3. A hash value is a number generated from a string of information (e.g., text, a number, or a combination thereof). Typically, a hash value is substantially smaller than the string of information from which it was generated. Hash functions (e.g., an MD5 hash function) are designed such that it is extremely unlikely that any two strings of information (i.e., the hash function input sequence) input to the hash function produce the same hash value.

FIG. 3 is an information flow diagram illustrating a known method of generating an MD5 hash value 318 from an MD5 hash function input sequence 302. The hash function input sequence 302 includes the message 310 and the appendage 317. The message 310 includes the MD5 protocol identifier 304, user's password 306 and MD5 challenge 308. The appendage includes hex 80 octet 312, padding octets 314 and eight-octet message length field 316. The value of message length field 316 indicates the length of message 310.

The MD5 hash function input sequence 302 is input to the hash generator 104 to produce MD5 hash value 318. The elements of input sequence 302, namely components 304, 306, 308, 312, 314 and 316 are received by the hash generator in the order shown in FIG. 3, starting with 304 and proceeding in ascending order.

MD5 is an iterative algorithm that applies a hash function repeatedly to successive 64-octet blocks of input sequence data until the entire input sequence has been hashed. The message included within the input sequence may be of any length, and the MD5 appendage is configured such that the total input sequence length is a multiple of 64 octets. Each iteration of the MD5 algorithm applies the hash function to two parameters: a 16-octet vector, and a 64-octet segment from the input sequence. If $f(x,y)$ is the hash function, $V[n]$ is an nth 16-octet vector, and $M[n]$ is an nth 64-octet message block, than $V(0)=I$, which is a fixed initialization vector defined for MD5, and $V[n+1]=f(V[n], M[n])$. The final output of the MD5 algorithm is a 16-octet vector defined as $V(N)$, where N is the number of 64-octet blocks included in the function input sequence. Accordingly, referring to FIG. 3, MD5 hash value 318 is a 16-octet vector, $V(N)$.

Returning to FIG. 2, in Act 210, a second communication is transmitted from the client to the tunnel server, the second communication including the generated MD5 hash value in response to the challenge, for example, MD5 hash value 318. In a final Act 212 of method 200, the user is authenticated based on the MD5 hash value, for example, by an authentication server.

Recent cryptographic analysis has revealed that, while tunneling protocols generally provide more secure communications across a network than authentication protocols, they introduce a new vulnerability in certain circumstances. Because these tunneling protocols do not cryptographically combine their encryption keys with encryption keys derived from the inner protocols that they encapsulate, it is possible for an attacker to effect the following attack, called a Man-in-the-Middle (MiM) attack. The attacker poses as an authentication server and dupes a client to use a password-based authentication protocol outside of a tunnel (i.e., in untunneled mode) to exchange protocol payloads with the attacker. Then, posing as the client, the attacker establishes communication with a tunnel server and establishes a tunnel. In response to the tunnel server's challenge, the client responds with a protocol payload (e.g., the response) gained from the client. The transmission of the protocol payload is encapsulated within the tunnel. Thus, the attacker authenticates to the server as if the attacker were the actual user. In order for such a MiM attack to be feasible, the following conditions must be met: (1) the user must use the same legacy authentication protocol both in tunneled and untunneled modes, (2) the user must use the same credentials (e.g., username and password) in both tunneled and untunneled modes, and (3) the attacker must be able to pose as an authentication server on the network on which the user uses the legacy protocol in untunneled mode.

Referring to FIG. 1, consider the example when the client 102 attempts to establish a session with an authentication server 126 across a wireless communication medium. The attacker 118 poses as the authentication server 126 and intercepts communications from the client 102. The attacker then issues a challenge 114 to the client in accordance with a legacy authentication protocol and outside of a tunnel (i.e., in untunneled mode), and the client 102 responds, outside of a tunnel, with a response 116 in accordance with the legacy authentication protocol. The attacker 118 records the response 116. The attacker 118 then initiates a session with another server using the same legacy authentication protocol, but inside of a tunnel. For example, attacker 118 initiates a session with tunnel server 112 or another server for which tunnel server 112 serves as an intermediate server for communication with attacker 118. In either event, the tunnel server 112 and the attacker 118 serve as terminals or endpoints for a tunnel 120. If the client 102 is configured to use the same legacy authentication protocol and use the same credentials within tunnel 120 as were used to generate response 116 outside of the tunnel 120, then, in response to challenge 124 (which is the same as challenge 114, albeit encapsulated within tunnel 120), attacker 118 responds with response 122 (which is the same as response 116, albeit encapsulated in tunnel 120). The tunnel server 112 or the authentication server then authenticates the user credentials within the response 122 and confirms that attacker 118 is client 102, allowing great mischief to follow.

The Internet Engineering Task Force (IETF) EAP working group is studying means to preclude the MiM attack. The current general opinion of that group is that the MiM attack only can be prevented if the inner protocol is capable of generating its own encryption keys. This opinion implies that tunneling protocols such as TTLS and PEAP can be made safe against the MiM attack for inner protocols that can generate encryption keys such as MS CHAP and SIM, but not for inner protocols such as CHAP, MDC or GenericTokenCard.

SUMMARY

In an embodiment of the invention, a user is at least partially authenticated on a communications network. A first communication is transmitted from a first network device to a second network device, wherein the first communication includes a challenge. In response to receiving the challenge, a preliminary hash value is generated by performing only part of a hash function on a first part of the challenge, wherein the first part is less than the complete challenge. A second communication is transmitted from the second network device to the first network device, the second communication including the preliminary hash value. Performance of the hash function is completed on the first network device to produce a final hash value.

In an aspect of this embodiment, only part of a Message Digest 5-based encryption function is performed.

In another aspect of this embodiment, a standard Message Digest 5 algorithm includes adding an appendage of information to information to be communicated to produce padded information that has a length that is a multiple of sixty-four octets, and includes inputting the padded information to a standard Message Digest 5 function. An input sequence to the Message Digest 5-based encryption function is generated by concatenating information to be communicated from the second network device to the first network device. The input sequence is input into the Message Digest 5-based encryption function without previously adding an appendage of information to the input sequence.

In another aspect of this embodiment, the complete performance of the hash function involves performing a first number of iterations, generating the preliminary hash value includes performing a second number of iterations less than the first number of iterations and completing the hash function includes performing a third number of iterations equal to the first number minus the second number, resulting in a complete performance of the hash function.

In yet another aspect of this embodiment, completing the hash function includes completing the hash function using a second part of the challenge, wherein the first part and the second part form the complete challenge.

In another aspect of this embodiment, generating the preliminary hash value includes generating the preliminary hash value based, at least in part, on the first part of the challenge and a user credential.

In another aspect of this embodiment, generating the preliminary hash value includes dividing the challenge into the first part and a second part, and the method further includes. The second communication is configured to include an indication of a length in bits of the user credential. Completing the hash function includes completing the hash function based, at least in part, on the second part of the challenge and the length of the user credential.

In yet another aspect of this embodiment, completing the hash function includes: determining a state of the hash function based, at least in part, on the length of the user credential; and completing the hash function based, at least in part, on the determined state.

In another aspect of this embodiment, completing the hash function further includes determining a length of the second part based, at least in part, on a length of the challenge and the length of the user credential, and completing the hash function based, at least in part, on the determined length of the second part.

In another aspect of this embodiment, the challenge is generated on the first network device, including generating a portion of the challenge having a length equal to a desired amount of entropy for the challenge, and appending bits to the portion of the challenge to produce the challenge.

In yet another aspect of this embodiment, generating the challenge includes appending sixty-three bits to the portion.

In another aspect of this embodiment, the challenge includes a plurality of sequences of bits. The challenge is generated on the first network device, including configuring one or more of the plurality of sequences (e.g., octets) to include at least one non-zero bit.

In another aspect of this embodiment, the challenge is generated on the first network device, including configuring the challenge to include at least a minimum number of octets of bits.

In yet another aspect of this embodiment, generating the preliminary hash value includes: (1) determining a length of a concatenation of an authentication protocol identifier, a user credential and the challenge; and (2) dividing the challenge into the first part and a second part based on the determined length.

In another aspect of this embodiment, the user is authenticated based on the final hash value.

In another aspect of this embodiment, a third communication including the final hash value is transmitted to a third network device configured to authenticate the user.

In yet another aspect of this embodiment, the first communication is transmitted within a tunnel between the first network device and the second network device.

In another embodiment of the invention, a computer program is used to control a computer to perform the method of the embodiment described in the preceding paragraphs.

In another embodiment of the invention, a computer-readable medium is provided that stores computer-readable signals defining instructions that, as a result of being executed by a computer, instruct the computer to perform the above method of the embodiment described in the preceding paragraphs.

In yet another embodiment of the invention, a system is provided for at least partially authenticating a user on a communications network. The system includes a first communication device operative to transmit a first communication from a first network device to a second network device, wherein the first communication includes a challenge. The system further includes a second network device, operative to receive the challenge, generate a preliminary hash value by performing only part of a hash function on a first part of the challenge, wherein the first part is less than the complete challenge, and to transmit a second communication from the second network device to the first network device, the second communication including the preliminary hash value. The first network device is operative to complete performance of the hash function to produce a final hash value.

In an aspect of this embodiment, the second network device is operative to perform only part of a Message Digest 5-based encryption function.

In another aspect of this embodiment, a standard Message Digest 5 algorithm includes adding an appendage of information to information to be communicated to produce padded information that has a length that is a multiple of sixty-four octets, and includes inputting the padded information to a standard Message Digest 5 function. The second network device is operative to generate an input sequence to the Message Digest 5-based encryption function by concatenating information to be communicated from the second network device to the first network device, and to input the input sequence into the Message Digest 5-based encryption function without previously adding an appendage of information to the input sequence.

In another aspect of this embodiment, the complete performance of the hash function involves performing a first number of iterations, and the second network device is operative to perform a second number of iterations less than the first number of iterations. The first network device is operative to perform a third number of iterations equal to the first number minus the second number, resulting in a complete performance of the hash function.

In another aspect of this embodiment, the first network device is operative to complete the hash function using a second part of the challenge, wherein the first part and the second part form the complete challenge.

In yet another aspect of this embodiment, the first network device is operative to generate the preliminary hash value based, at least in part, on the first part of the challenge and a user credential.

In another aspect of this embodiment, the second network device is operative to divide the challenge into the first part and a second part, and to configure the second communication to include an indication of a length in bits of the user credential. The first network device is operative to complete the hash function based, at least in part, on the second part of the challenge and the length of the user credential.

In another aspect of this embodiment, the first network device is operative to determine a state of the hash function based, at least in part, on the length of the user credential, and to complete the hash function based, at least in part, on the determined length.

In yet another aspect of this embodiment, the first network device is operative to determine a length of the second part based, at least in part, on a length of the challenge and the length of the user credential, and to complete the hash function based, at least in part, on the determined length of the second part.

In another aspect of this embodiment, the first network device is operative to generate the challenge on the first network device, including generating a portion of the challenge having a length equal to a desired amount of entropy for the challenge, and to append bits to the portion of the challenge to produce the challenge.

In another aspect of this embodiment, the first network device is operative to append sixty-three bits to the portion.

In another aspect of this embodiment, challenge includes a plurality of sequences (e.g., octets) of bits, and the first network device is operative to generate the challenge on the first network device, including configuring one or more of the plurality of sequences to include at least one non-zero bit.

In another aspect of this embodiment, the first network device is operative to generate the challenge on the first network device, including configuring the challenge to include at least a minimum length of bits.

In yet another aspect of this embodiment, the second network device is operative to determine a length of a concatenation of an authentication protocol identifier, a user credential and the challenge, and to divide the challenge into the first part and a second part based on the determined length.

In another aspect of this embodiment, the first network device is operative to authenticate the user based on the final hash value.

In another aspect of this embodiment, the first network device is operative to transmit a third communication including the final hash value to a third network device configured to authenticate the user.

In another aspect of this embodiment, the first network device is operative to transmit the first communication within a tunnel between the first network device and the second network device.

In another aspect of this embodiment, the second communication device is operative to transmit the second communication with a tunnel between the first device and the second device.

In another embodiment of the invention, a system is provided for at least partially authenticating a user on a communications network. The system includes a first communication device operative to transmit a first communication from a first network device to a second network device, wherein the first communication includes a challenge. The system further includes a second network device operative to receive the challenge and transmit a second communication from the second network device to the first network device, the second communication including a preliminary hash value The second network device includes means for generating a preliminary hash value by performing only part of a hash function on a first part of the challenge, wherein the first part is less than the complete challenge. Further, the first network device includes means for completing performance of the hash function to produce a final hash value.

In an aspect of this embodiment, the second network device includes means for performing only part of a Message Digest 5-based encryption function.

In another aspect of this embodiment, a standard Message Digest 5 algorithm includes adding an appendage of information to information to be communicated to produce padded information that has a length that is a multiple of sixty-four octets, and includes inputting the padded information to a standard Message Digest 5 function. The second network device includes means for generating an input sequence to the Message Digest 5-based encryption function by concatenating information to be communicated from the second network device to the first network device, and includes means for inputting the input sequence into the Message Digest 5-based encryption function without previously adding an appendage of information to the input sequence.

In another aspect of this embodiment, the complete performance of the hash function involves performing a first number of iterations, and the second network device includes means for performing a second number of iterations less than the first number of iterations, and wherein the first network device includes means for performing a third number of iterations equal to the first number minus the second number, resulting in a complete performance of the hash function.

In another aspect of this embodiment, the first network device includes means for completing the hash function using a second part of the challenge, wherein the first part and the second part form the complete challenge.

In another aspect of this embodiment, the first network device includes means for generating the preliminary hash value based, at least in part, on the first part of the challenge and a user credential.

In yet another aspect of this embodiment, the second network device includes means for dividing the challenge into the first part and a second part, and for configuring the second communication to include an indication of a length in bits of the user credential. In this aspect, the first network device includes means for completing the hash function based, at least in part, on the second part of the challenge and the length of the user credential.

In another aspect of this embodiment, the first network device includes means for determining a state of the hash function based, at least in part, on the length of the user credential, and for completing the hash function based, at least in part, on the determined length.

In another aspect of this embodiment, the first network device includes means for determining a length of the second part based, at least in part, on a length of the challenge and the length of the user credential, and for completing the hash function based, at least in part, on the determined length of the second part.

In another aspect of this embodiment, the first network device includes means for generating the challenge on the first network device, including means for generating a portion of the challenge having a length equal to a desired amount of entropy for the challenge, and means for appending bits to the portion of the challenge to produce the challenge.

In another aspect of this embodiment, the first network device includes means for appending sixty-three bits to the portion.

In yet another aspect of this embodiment, the challenge includes a plurality of sequences (e.g., octets) of bits, and the first network device includes means for generating the challenge on the first network device, including means for configuring one or more of the plurality of sequences to include at least one non-zero bit.

In another aspect of this embodiment, the first network device includes means for generating the challenge on the first network device, including means for configuring the challenge to include at least a minimum length of bits.

In another aspect of this embodiment, the second network device includes means for determining a length of a concatenation of an authentication protocol identifier, a user credential and the challenge, and means for dividing the challenge into the first part and a second part based on the determined length.

In another aspect of this embodiment, the first network device includes means for authenticating the user based on the final hash value.

In another aspect of this embodiment, the first network device includes means for transmitting a third communication including the final hash value to a third network device configured to authenticate the user.

In another aspect of this embodiment, the first network device includes means for transmitting the first communication within a tunnel between the first network device and the second network device.

In another aspect of this embodiment, the second communication device includes means for transmitting the second communication with a tunnel between the first device and the second device.

In an embodiment of the invention, a user is at least partially authenticated on a communications network. A first communication is transmitted from a first network device to a second network device, wherein the first communication includes a challenge. A second communication is received from the second network device to the first network device, the second communication including a preliminary hash value resulting from performance of only part of a hash function on a first part of the challenge, wherein the first part is less than the complete challenge. Performance of the hash function is completed on the first network device to produce a final hash value.

In an aspect of this embodiment, the preliminary hash value is a result of partial performance of an Message Digest 5-based encryption function on the first part of the challenge, and completing the hash function includes completing the Message Digest 5-based encryption function.

In another aspect of this embodiment, the complete performance of the hash function involves performing a first number of iterations, and wherein the preliminary hash value resulted from performance of a second number of iterations less than the first number of iterations. In this aspect, completing the hash function includes performing a third number of iterations equal to the first number minus the second number, resulting in a complete performance of the hash function.

In another aspect of this embodiment, completing the hash function includes completing the hash function using a second part of the challenge, wherein the first part and the second part form the complete challenge.

In yet another aspect of this embodiment, the challenge includes two parts: the first part and a second part, and the preliminary hash value is based, at least in part, on the first part of the challenge and a user credential. The second communication includes an indication of a length in bits of the user credential. In this aspect, completing the hash function includes completing the hash function based, at least in part, on the second part of the challenge and the length of the user credential.

In another aspect of this embodiment, completing the hash function includes: (1) determining a state of the hash function based, at least in part, on the length of the user credential; and (2) completing the hash function based, at least in part, on the determined state.

In another aspect of this embodiment, completing the hash function includes: (1) determining a length of the second part based, at least in part, on a length of the challenge and the length of the user credential; and (2)

completing the hash function based, at least in part, on the determined length of the second part.

In another aspect of this embodiment, the challenge is generated on the first network device, including generating a portion of the challenge having a length equal to a desired amount of entropy for the challenge, and appending bits to the portion of the challenge to produce the challenge.

In another aspect of this embodiment, generating the challenge includes appending sixty-three bits to the challenge.

In yet another aspect of this embodiment, the challenge includes a plurality of sequences (e.g., octets) of bits. The challenge is generated on the first network device, including configuring one or more of the plurality of sequences to include at least one non-zero bit.

In another aspect of this embodiment, the challenge is generated on the first network device, including configuring the challenge to include at least a minimum length of bits.

In another aspect of this embodiment, the user is authenticated based on the final hash value.

In another aspect of this embodiment, a third communication including the final hash value is transmitted to a third network device configured to authenticate the user.

In another embodiment of the invention, a computer program is used to control a computer to perform the method of the embodiment described in the preceding paragraphs In another embodiment of the invention, a computer-readable medium is provided that stores computer-readable signals defining instructions that, as a result of being executed by a computer, instruct the computer to perform the above method of the embodiment described in the preceding paragraphs.

In another embodiment of the invention, a system is provided for at least partially authenticating a user on a communications network In another embodiment of the invention, a tunnel server residing on a first network device of a communications network at least partially authenticating a user on the communications network. The tunnel server includes a challenge generator to generate a challenge that is transmitted from the first network device to a second network device. The tunnel server further includes a final hash value generator to receive a preliminary hash value from the second network device, the preliminary hash value resulting from performance of only part of a hash function on a first part of the challenge, wherein the first part is less than the complete challenge. The final hash value generator is operative to complete performance of the hash function on the first network device to produce a final hash value.

In an aspect of this embodiment, the complete performance of the hash function involves performing a first number of iterations, and the preliminary hash value is the result of performance of a second number of iterations less than the first number of iterations. In this aspect, the final hash value generator is operative to perform a third number of iterations equal to the first number minus the second number, resulting in a complete performance of the hash function.

In another aspect of this embodiment, the final hash value generator is operative to complete the hash function using a second part of the challenge, wherein the first part and the second part form the complete challenge.

In another aspect of this embodiment, the challenge includes the first part and a second part, and the second communication includes an indication of a length in bits of a user credential. Further, the final hash value generator is operative to complete the hash function based, at least in part, on the second part of the challenge and the length of the user credential.

In yet another aspect of this embodiment, the final hash value generator is operative to determine a state of the hash function based, at least in part, on the length of the user credential, and to for complete the hash function based, at least in part, on the determined length.

In another aspect of this embodiment, the final hash value generator is operative to determine a length of the second part based, at least in part, on a length of the challenge and the length of the user credential, and to complete the hash function based, at least in part, on the determined length of the second part.

In another aspect of this embodiment, the challenge generator is operative to generate the challenge, to generate a portion of the challenge having a length equal to a desired amount of entropy for the challenge, and to append bits to the portion of the challenge to produce the challenge.

In another aspect of this embodiment, the challenge generator is operative to append sixty-three bits to the portion.

In yet another aspect of this embodiment, the challenge includes a plurality of sequences (e.g., octets) of bits, and the challenge generator is operative to generate the challenge, and to configure one or more of the plurality of sequences to include at least one non-zero bit.

In another aspect of this embodiment, the challenge generator is operative to generate the challenge, including configuring the challenge to include at least a minimum length of bits.

In another aspect of this embodiment, the tunnel server is operative to authenticate the user based on the final hash value.

In yet another aspect of this embodiment, the tunnel server is operative to control transmission of a third communication including the final hash value to a third network device configured to authenticate the user.

In another aspect of this embodiment, the tunnel server is operative to control transmission of the first communication within a tunnel between the first network device and the second network device.

In another embodiment of the invention, a tunnel server residing on a first network device of a communications network at least partially authenticating a user on the communications network. The tunnel server includes a challenge generator to generate a challenge that is transmitted from the first network device to a second network device. The tunnel server is operative to receive a preliminary hash value from the second network device, the preliminary hash value resulting from performance of only part of a hash function on a first part of the challenge, wherein the first part is less than the complete challenge. The tunnel server further includes means for completing performance of the hash function on the first network device to produce a final hash value.

In an aspect of this embodiment, the complete performance of the hash function involves performing a first number of iterations, and the preliminary hash value is the result of performance of a second number of iterations less than the first number of iterations. The tunnel server includes means for performing a third number of iterations equal to the first number minus the second number, resulting in a complete performance of the hash function.

In another aspect of this embodiment, the tunnel server includes means for completing the hash function using a second part of the challenge, wherein the first part and the second part form the complete challenge.

In another aspect of this embodiment, the challenge includes the first part and a second part, and the second communication includes an indication of a length in bits of a user credential. In this aspect, the tunnel server includes means for completing the hash function based, at least in part, on the second part of the challenge and the length of the user credential.

In yet another aspect of this embodiment, the tunnel server includes means for determining a state of the hash function based, at least in part, on the length of the user credential, and for completing the hash function based, at least in part, on the determined length.

In another aspect of this embodiment, the tunnel server includes means for determining a length of the second part based, at least in part, on a length of the challenge and the length of the user credential, and for completing the hash function based, at least in part, on the determined length of the second part.

In another aspect of this embodiment, the challenge generator includes means for generating the challenge on the tunnel server, including means for generating a portion of the challenge having a length equal to a desired amount of entropy for the challenge, and means for appending bits to the portion of the challenge to produce the challenge.

In another aspect of this embodiment, the challenge generator includes means for appending sixty-three bits to the portion.

In another aspect of this embodiment, the challenge includes a plurality of sequences (e.g. octets) of bits, and the challenge generator includes means for generating the challenge, including means for configuring one or more of the plurality of sequences to include at least one non-zero bit.

In yet another aspect of this embodiment, the challenge generator includes means for generating the challenge, including means for configuring the challenge to include at least a minimum length of bits.

In another aspect of this embodiment, the tunnel server includes means for authenticating the user based on the final hash value.

In another aspect of this embodiment, the tunnel server includes means for transmitting a third communication including the final hash value to a third network device configured to authenticate the user.

In another aspect of this embodiment, the tunnel server includes means for transmitting the first communication within a tunnel between the first network device and the second network device.

In an embodiment of the invention, a user is at least partially authenticated on a communications network in response to a challenge received at a second network device from a first network device. A preliminary hash value is generated by performing only part of a hash function on a first part of the challenge wherein the first part is less than the complete challenge. A communication is transmitted from the second network device to the first network device, the communication including the preliminary hash value.

In an aspect of this embodiment, generating the preliminary hash value includes performing only part of a Message Digest 5-based encryption function.

In another aspect of this embodiment, a standard Message Digest 5 algorithm includes adding an appendage of information to information to be communicated to produce padded information that has a length that is a multiple of sixty-four octets, and includes inputting the padded information to a standard Message Digest 5 function. In this aspect, generating the preliminary hash value includes: (1) generating an input sequence to the Message Digest 5-based encryption function by concatenating information to be communicated from the second network device to the first network device; and (2) inputting the input sequence into the Message Digest 5-based encryption function without previously adding an appendage of information to the input sequence.

In yet another aspect of this embodiment, the complete performance of the hash function involves performing a first number of iterations, and generating the preliminary hash value includes performing a second number of iterations less than the first number of iterations.

In another aspect of this embodiment, generating the preliminary hash value includes generating the preliminary hash value based, at least in part, on the first part of the challenge and a user credential.

In another aspect of this embodiment, generating the preliminary hash value includes dividing the challenge into the first part and a second part. The communication to include an indication of a length in bits of the user credential.

In another aspect of this embodiment, generating the preliminary hash value includes: (1) determining a length of a concatenation of an authentication protocol identifier, a user credential and the challenge; and (2) dividing the challenge into the first part and a second part based on the determined length.

In another aspect of this embodiment, the first communication is transmitted within a tunnel between the first network device and the second network device.

In another embodiment of the invention, a system is provided for at least partially authenticating a user on a communications network.

In another embodiment of the invention, a computer program is used to control a computer to perform the method of the embodiment described in the preceding paragraphs.

In another embodiment of the invention, a computer-readable medium is provided that stores computer-readable signals defining instructions that, as a result of being executed by a computer, instruct the computer to perform the above method of the embodiment described in the preceding paragraphs.

In another embodiment of the invention, a client residing on a second network device of a communications network at least partially authenticating a user in response to a challenge received on the second network device from a first network device. The client includes a preliminary hash generator to generate a preliminary hash value by performing only part of a hash function on a first part of the challenge, wherein the first part is less than the complete challenge. The second network device is operative to transmit a communication from the second network device to the first network device, the communication including the preliminary hash value.

In an aspect of this embodiment, the preliminary hash generator is operative to perform only part of a Message Digest 5-based encryption function.

In another aspect of this embodiment, a standard Message Digest 5 algorithm includes adding an appendage of information to information to be communicated to produce padded information that has a length that is a multiple of sixty-four octets, and includes inputting the padded information to a standard Message Digest 5 function. In this aspect, the preliminary hash generator is operative to generate an input sequence to the Message Digest 5-based encryption function by concatenating information to be communicated from the second network device to the first network device, and to input the input sequence into the Message Digest 5-based encryption function without previously adding an appendage of information to the input sequence.

In another aspect of this embodiment, the complete performance of the hash function involves performing a first number of iterations. The preliminary hash generator is operative to perform a second number of iterations less than the first number of iterations.

In another aspect of this embodiment, the preliminary hash generator is operative to generate the preliminary hash value based, at least in part, on the first part of the challenge and a user credential.

In yet another aspect of this embodiment, the preliminary hash generator is operative to divide the challenge into the first part and a second part, and to configure the communication to include an indication of a length in bits of the user credential.

In another aspect of this embodiment, the preliminary hash generator is operative to determine a length of a concatenation of an authentication protocol identifier, a user credential and the challenge, and to divide the challenge into the first part and a second part based on the determined length.

In another aspect of this embodiment, the client is operative to control transmission of the first communication within a tunnel between the first network device and the second network device.

In another embodiment of the invention, a client residing on a second network device of a communications network at least partially authenticating a user in response to a challenge received on the second network device from a first network device. The client includes means for generating a preliminary hash value by performing only part of a hash function on a first part of the challenge, wherein the first part is less than the complete challenge. The second network device is operative to transmit a communication from the second network device to the first network device, the communication including the preliminary hash value.

In an aspect of this embodiment, the means for generating includes means for performing only part of a Message Digest 5-based encryption function.

In another aspect of this embodiment, a standard Message Digest 5 algorithm includes adding an appendage of information to information to be communicated to produce padded information that has a length that is a multiple of sixty-four octets, and includes inputting the padded information to a standard Message Digest 5 function. In this aspect, the means for generating includes means for generating an input sequence to the Message Digest 5-based encryption function by concatenating information to be communicated from the second network device to the first network device, and means for inputting the input sequence into the Message Digest 5-based encryption function without previously adding an appendage of information to the input sequence.

In an aspect of this embodiment, the complete performance of the hash function involves performing a first number of iterations. The means for generating includes means for performing a second number of iterations less than the first number of iterations.

In an aspect of this embodiment, the means for generating includes means for generating the preliminary hash value based, at least in part, on the first part of the challenge and a user credential.

In an aspect of this embodiment, the means for generating includes means for dividing the challenge into the first part and a second part, and means for configuring the communication to include an indication of a length in bits of the user credential.

In yet an aspect of this embodiment, the means for generating includes means for determining a length of a concatenation of an authentication protocol identifier, a user credential and the challenge, and means for dividing the challenge into the first part and a second part based on the determined length.

In an aspect of this embodiment, the client further includes means for controlling transmission of the first communication within a tunnel between the first network device and the second network device.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

Figure 1:
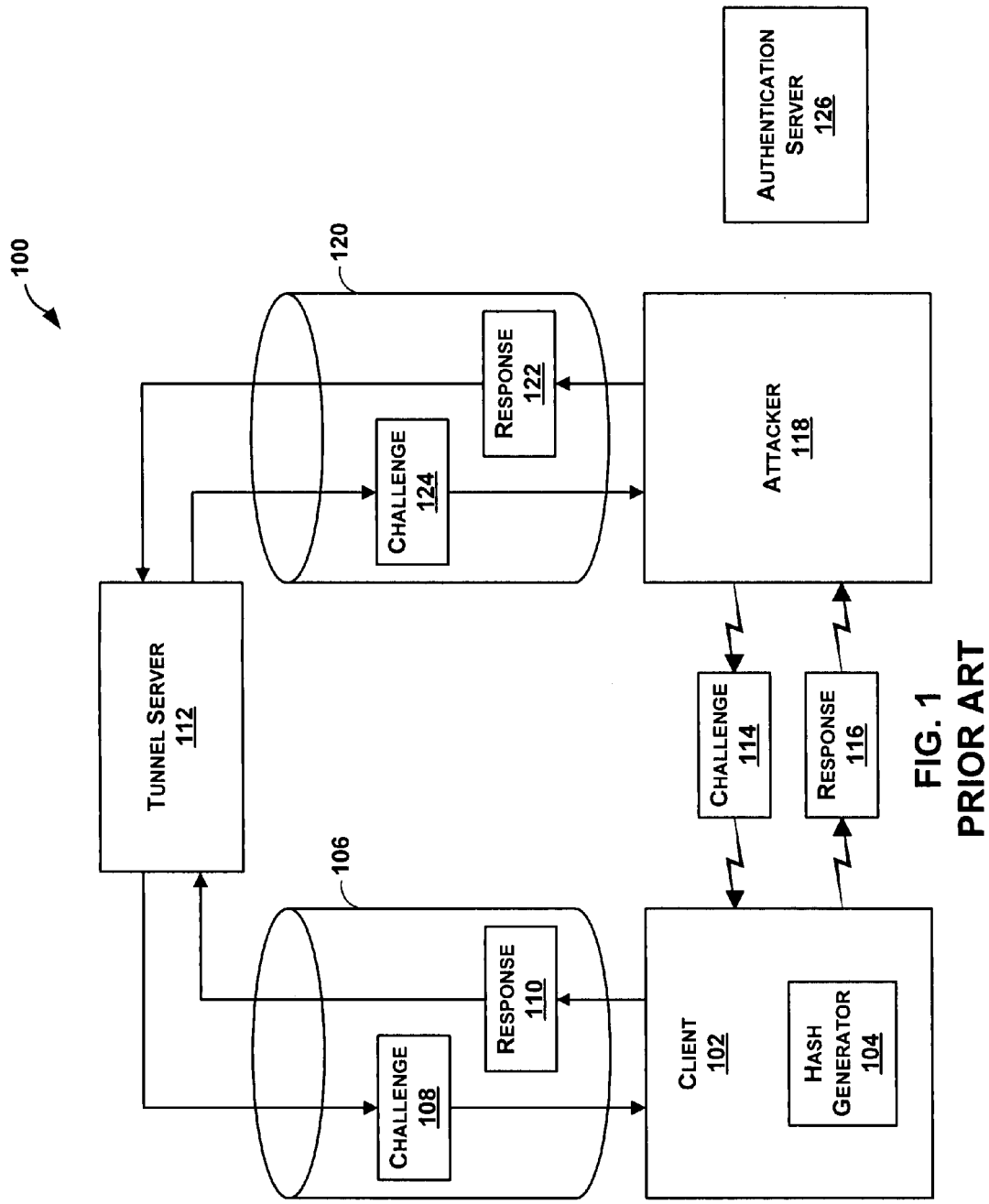
FIG. 1 is a block and information flow diagram illustrating an example of a known system for encapsulating inner protocol communications within a tunnel provided by a tunneling protocol.
Figure 2:
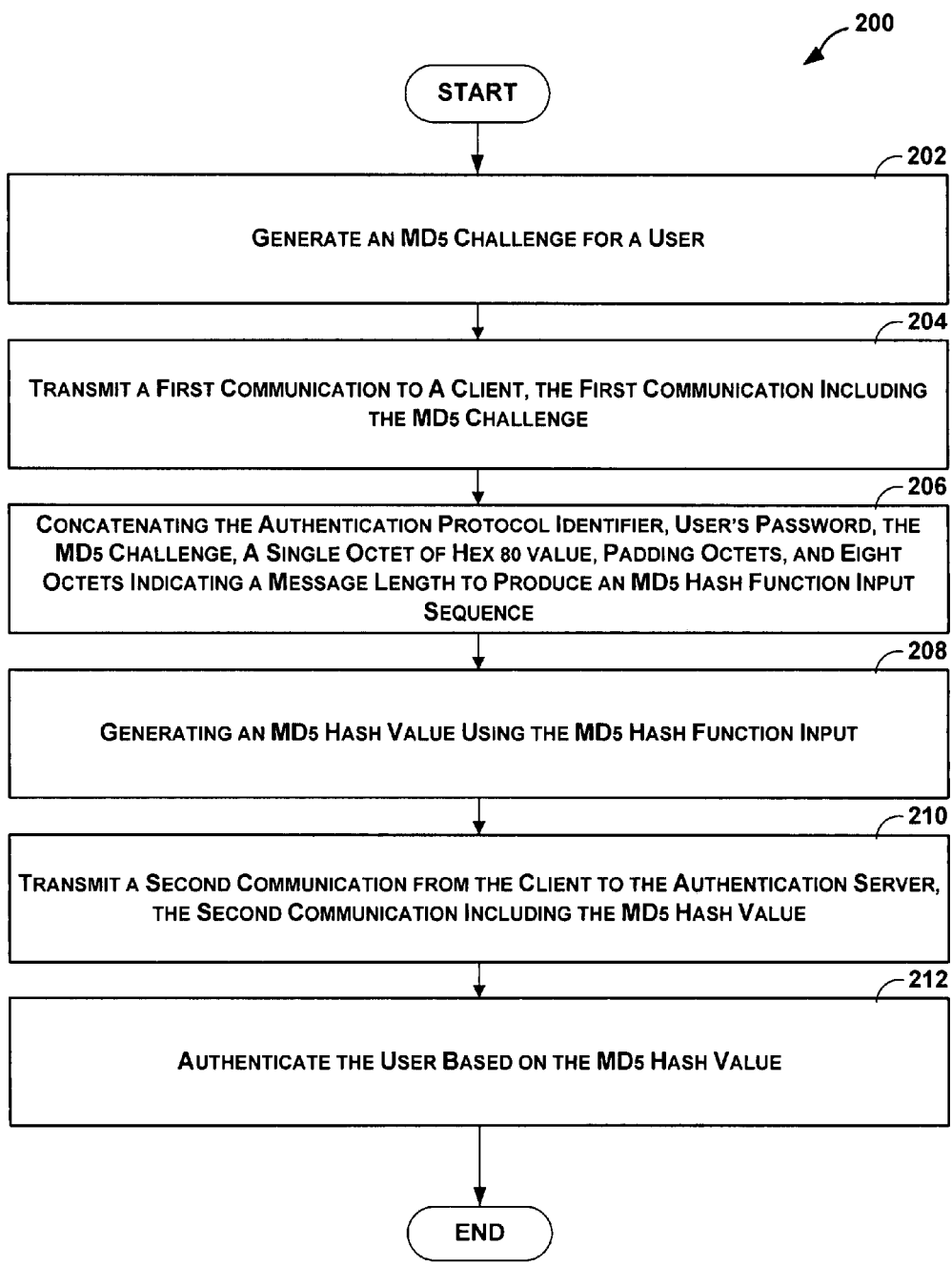
FIG. 2 is a flowchart illustrating an example of a known method of authenticating a user according to an MD5 algorithm.

Although the systems and methods described below are described primarily in relation to exchanging communication on a network in accordance with a tunneled authentication protocol, the systems and methods described herein are not limited thereto, but may be applied to any exchange of communications between devices, for example, any exchange of communication on a network involving encryption of data. Further, although the systems and methods described below are described often in illustrative relation to use of an MD5-based authentication protocol and/or an MD5-based hashing function, the systems and methods described herein are not limited thereto, as other authentication protocols and hashing functions may be used.

Described herein are systems and methods for preventing a MiM attack without combining encryption keys of an inner protocol and a tunneling protocol.

The performance of a hash function (e.g., a one-way hash function such as an MD5-based hash function) may be split between logical components residing on separate network devices. For example, in response to a challenge issued by a tunnel server on a first network device, a client on a second network device may initiate performance of a hash function and generate an intermediate result of the hash function (i.e., a preliminary hash value). The second network device then may transmit the preliminary hash value to the tunnel server on the first network device as part of a response to the challenge. The tunnel server then may complete the hash function to produce a final hash value. The final hash value then may be used to authenticate a user.

A challenge issued by a tunnel server may be divided into a first part and a second part by a client. The client may use the first part only to generate a response to the challenge (e.g., a preliminary hash value), and the tunnel server may use the second part of the challenge to produce a final hash value. For example, the tunnel server may use the preliminary hash value as an initialization vector to a hash function (e.g., a one-way hash function such as an MD5-based hash function) and use the second part of the challenge to create a hash function input sequence for the hash function, and then perform the hash function to produce the final hash value. The final hash value then may be used to authenticate a user.

The final hash value resulting from splitting performance of the hash function, which may include dividing the challenge into parts, may be the same as a hash value that would be produced using known authentication protocols, e.g. MDC or CHAP, to respond to the challenge. Thus, the final hash value may be sent as a response to an authentication server in accordance with a known protocol, such as MDC or CHAP. Accordingly, the preliminary hash value may be converted to a final hash value that may be used by known protocols to authenticate a user. Conversely, a final hash value generated by a known protocol cannot be converted to a preliminary hash, for example, by an attacker, for reasons that will become clear below.

A MiM attack may be prevented by: splitting performance of a hash function and/or dividing the challenge into first and second parts, as described above, for authentication performed within a secure tunnel; and performing known authentication outside of tunnels. As a result, an attacker could not launch a MiM attack as described above because the response (i.e., a final hash value) that the attacker would learn outside of the tunnel in response to a particular challenge would not be the same as the response (i.e., a preliminary hash value) that the tunnel server would be expecting inside of the tunnel in response to the same challenge. Thus, the attacker would fail to authenticate as a user inside of the tunnel. Accordingly, use of known MD5-based protocols such as CHAP and MDC outside of a tunnel can be protected against a MiM attack.

The function and advantages of these and other embodiments of the present invention will be more fully understood from the examples described below. The following examples are intended to facilitate an understanding of the invention and illustrate the benefits of the present invention, but do not exemplify the full scope of the invention.

EXAMPLES

Although the systems and methods described herein are not limited to use of an MD5 hash function, an MD5 hash function will be used as an illustrative example throughout this application. Accordingly, the following terms will be used for illustrative purposes and will have the following meanings throughout this application:

$f(x,y)$ is an MD5-based hash function, where $x$ is a 16-octet vector and $y$ is a 64-octet message segment;

$V$ is a 16-octet vector that is input to and output by the MD5 hash function, where $V[0]=I$, the fixed MD5 initialization vector; and $V[n]$, with $n>0$, is the output of the $(n-1)$th iteration of the hash function $F(x,y)$, and input to the nth iteration of the hash function $f(x,y)$;

$L(x)$ is the length, in octets, of a sequence $x$;

ID is the one octet EAP identifier;

P is the user password;

C is the challenge;

S is the sequence ID|P|C, which, for known MD5-based protocols, is the sequence (i.e., message) from which a hash function input sequence is generated for the known MD5 function;

C1 and C2 are two subsequences (i.e., parts) of the challenge C, which, when concatenated, form the entire challenge; i.e., C=C1|C2. C1 is the part of the challenge that will be hashed by the client to produce a preliminary hash value, as will be described in more detail below, and C2 is the part that will be used by the tunnel server to generate a final hash value from the preliminary hash. The challenge may be partitioned such that L (ID|P|C1) is an exact multiple of 64 octets, as described more fully below;

C1MIN is the minimum length of C1 that may be required to provide at least a desired amount of sufficient challenge entropy; thus, L (C1) must be>=C1MIN;

S' is the sequence ID|P|C1, which is the portion of S that may be hashed by the client as will be shown below; L (S') may be configured to be a multiple of 64 octets;

N is the number of 64-octet segments in S'; i.e., L (S')=64*N;

R' is the client 16-octet response, based on the new MD5-based algorithm described below;

R is the response computed by the tunnel server, as described below in more detail, based on R' and C2. R is the response that would result by performing a known MD5-based authentication protocol on the complete challenge C.

Figure 4:
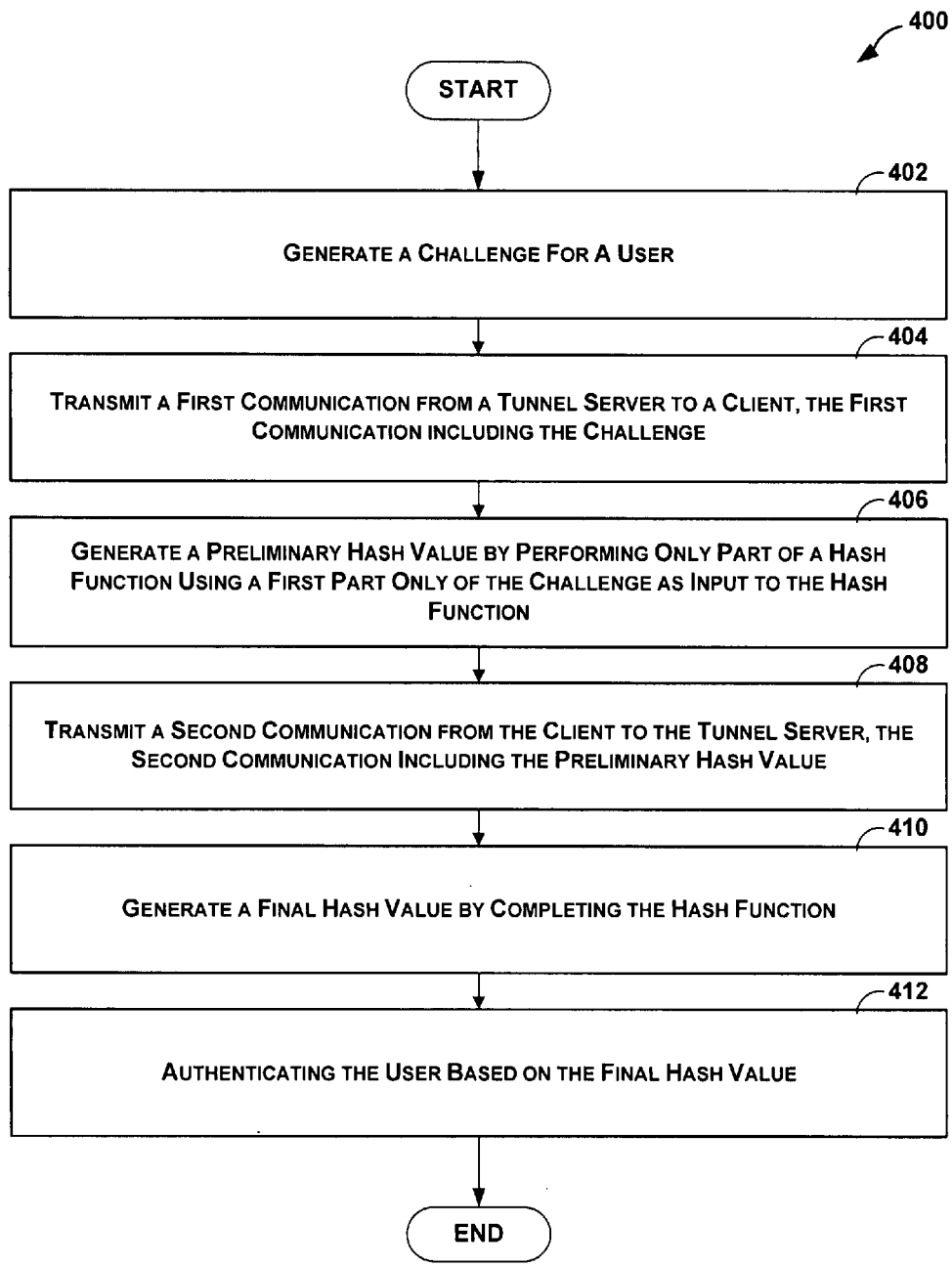
FIG. 4 is a flowchart illustrating an example of a method of authenticating a user on a communications network according to one or more embodiments of the invention.

FIG. 4 is a flowchart illustrating an example of a method 400 of authenticating a user on a communications network according to an embodiment of the invention. In an embodiment, in order to avoid a MiM attack, a client uses method 400 for all communications transmitted within a tunnel across a communications network, but uses a different protocol, for example, CHAP or MDC, for communications outside of a tunnel.

In Act 402, a challenge is generated for a user. For example, the challenge is generated by an authentication server which may reside on a same network device as the tunnel server or on a separate network device, in which case the tunnel server is logically interposed on a network device between the network device on which the authentication server resides and the network device on which the client resides.

The challenge may be conditioned (i.e., configured) in any of a variety of ways. For example, the challenge may be configured to have a length that provides at least a minimum amount of entropy. In an embodiment, the challenge is an MD5 challenge, where the MD5 challenge is conditioned to have a length of at least four octets to provide a minimum amount of entropy. As will be described in more detail below, the client may be configured to use only a portion, C1, of the challenge, C, to generate a response to the challenge. Accordingly, if the challenge is an MD5 challenge, then Act 402 may include adding an additional amount of challenge material (e.g., 63 octets) to the challenge beyond the minimum desired entropy, C1MIN, of the part of the challenge used by the client. A challenge padded with extra information (e.g., extra bits or octets of bits (e.g., 63)) is referred to herein as a "padded challenge." For example, in an embodiment of the invention, C1MIN=16, and, therefore, the padded challenge is configured to have a length of 79 (16+63) octets. Configuring the padded challenge such that L(C)=C1MIN+63 may ensure a minimum length, C1MIN, of C1 because of the manner in which the challenge, C, is partitioned into C1 and C2, for example, as described below in more detail in relation to Act 602 of method 600.

Figure 3:
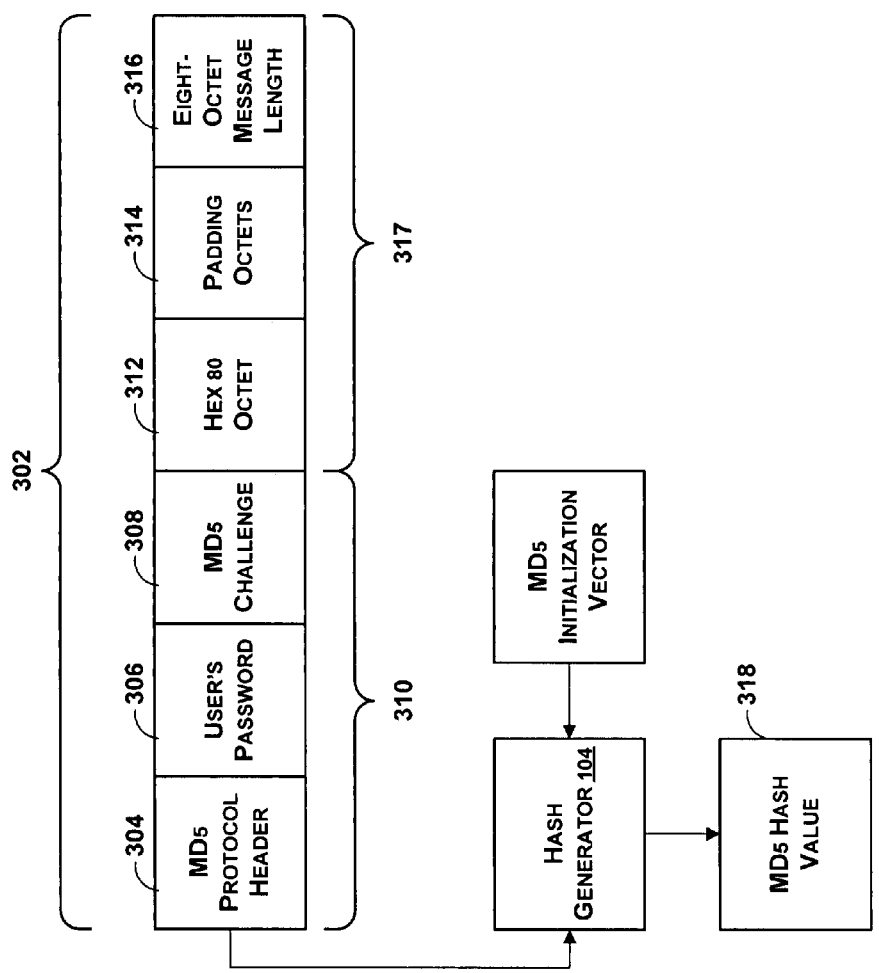
FIG. 3 is an information flow diagram illustrating a known method of generating an MD5 hash value from an MD5 hash function input sequence.

Although the probability is low, the hash function input sequence (e.g., 1002 described below in relation to FIG. 10) generated in accordance with embodiments of this invention could, theoretically, include the same sequence of bits as the hash function input sequence 302 (FIG. 3) generated in accordance with known MD5 algorithms. For example, an attacker could launch a MiM attack, send a challenge to a client outside of a tunnel using an MD5 protocol and elicit a response that is identical to a response that could result from performance of Act 406 and/or method 500.

As described above, hash function input sequence 302 includes a message length octet 316 that indicates the length of message 310. In an embodiment of the invention in which the challenge is an MD5 challenge, the MD5 challenge generated by Act 402 may be configured so that Act 406 cannot produce a hash function input sequence (e.g., 1002) that is possibly the same as a hash function input sequence 302 generated in accordance with known MD5 algorithms. For example, the MD5 challenge may be configured such that no eight-octet sequence of the challenge has a binary value that could possibly represent a length of an MD5 message 310. Accordingly, no last eight-octet sequence of the first part of the challenge (e.g., 1004) could possibly have a same value as an eight-octet message length 316 of the hash function input sequence 302 generated using a known MD5 algorithm. Act 402 may achieve this goal in any of a variety of ways, for example, by configuring each octet of the challenge to have a non-zero value (i.e., include at least one logical "1"). Any eight-octet sequence resulting from combining such non-zero octets will have a value that is too large to be equal to an eight-octet message length 316 resulting from an MD5 algorithm performed outside of a tunnel.

Returning to method 400, in Act 404, a first communication is transmitted from a first network device on which the tunnel server resides to a second network device on which a client resides. This first communication includes the challenge.

Figure 5:
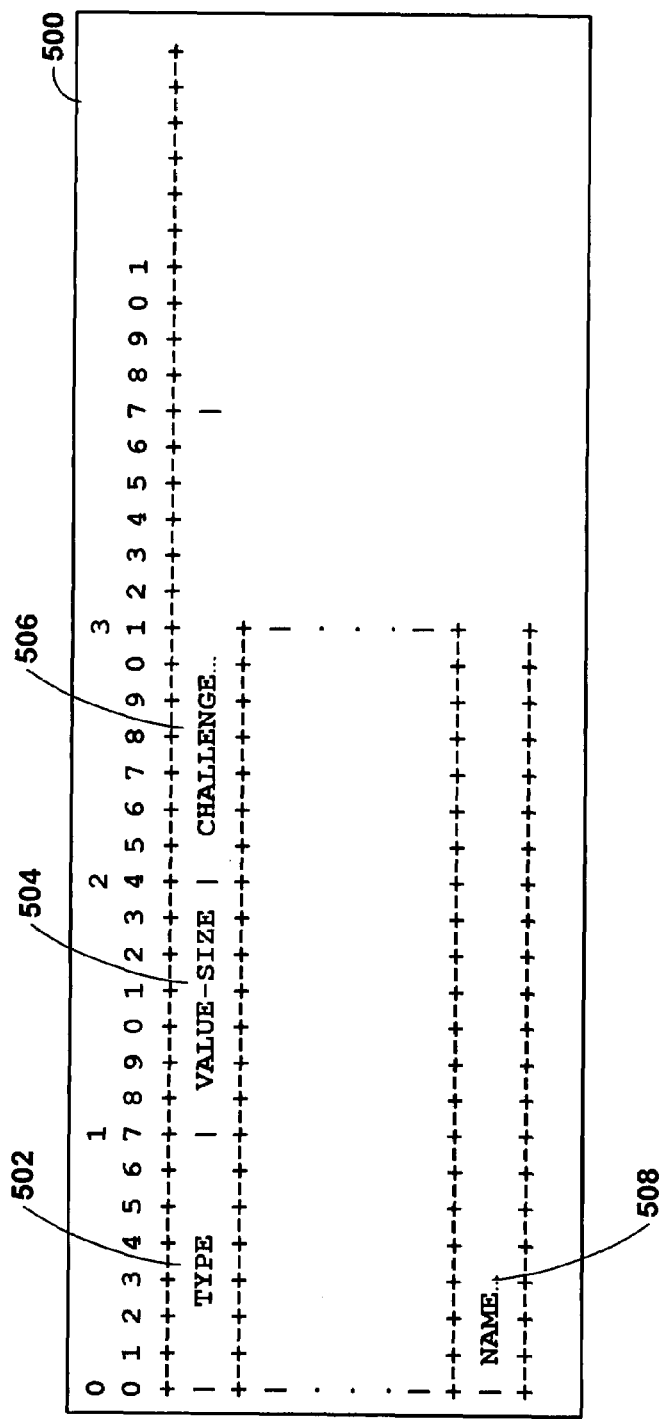
FIG. 5 is a block diagram illustrating an example of a data structure of a payload of a communication, including a challenge, transmitted from a tunnel server to a client in accordance with one or more embodiments of the invention.

FIG. 5 illustrates, diagrammatically, an example of a data structure of a payload 500 of a first communication transmitted from the first network device to the second network device. It should be appreciated that payload 500 does not include any header information that may be included as part of the first communication. The type field 502 is one octet and may be set to a value that indicates the type of the authentication protocol, for example, a protocol for implementing method 400. The client may use Field 502 to determine to implement a protocol in accordance with method 400 as opposed to known protocols such as CHAP or MDC. Value-size field 504 is one octet in length and indicates the length of the variable-length challenge field 506. Challenge field 506 includes the challenge. Name field 508 may be used to identify the first network device or for another purpose.

After performance of Act 404 and before performing Act 406, the client may verify that the transmitted challenge meets certain requirements. For example, the client may verify that the challenge has at least a minimum length in octets, for example, a certain number of octets (e.g., 63) greater than the minimum desired entropy, C1MIN, of the first part of the challenge. Further, the client may verify that a first part of the challenge will not have a last eight-octets that may possibly have a same value as an eight-octet message length field of a hash function input sequence that could be produced by known MD5 algorithms. For example, client may verify that each octet of the challenge has a non-zero value.

If the client determines that any requirements of the challenge are not met, then the client may be configured to refuse to proceed with the authentication process, and may send a communication to the tunnel server indicating a failure of the challenge to meet these requirements.

Similarly, if the tunnel server is serving as an intermediate server between an authentication server that issues the challenge and the client, then the tunnel server may not generate the challenge in Act 402, but may receive the challenge from the authentication server. In such a case, the tunnel server may require that the challenge meet certain requirements, for example, requirements similar to or the same as those that may be imposed by the client when it receives the challenge from the tunnel server. If the tunnel server determines that any requirements of the challenge are not met, then the tunnel server may be configured to refuse to proceed with the authentication process, and may send a communication to the authentication server indicating a failure of the challenge to meet these requirements.

Returning to method 400, in Act 406, a preliminary hash value may be generated using a first part only of the challenge, for example, as described below in more detail in relation to method 600. The preliminary hash value is "preliminary" in the sense that it is not the final result of the complete hash function, but merely a hash value resulting from performance of only part of the hashing function on a first part only of the hashing function.

Figure 6:
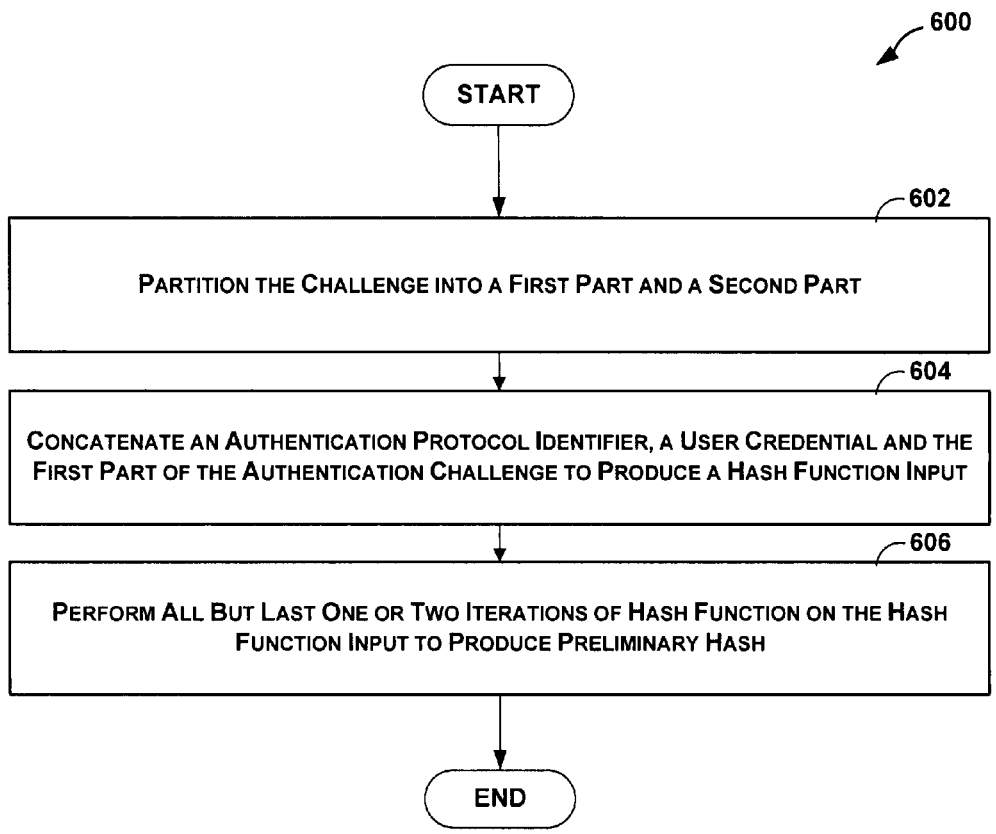
FIG. 6 is a flow chart illustrating an example of a method of generating a preliminary hash value using a first part only of a challenge in accordance with one or more embodiments of the invention.

FIG. 6 is a flow chart illustrating an example of a method 500 of generating a preliminary hash value using a first part only of a challenge.

In Act 602, the challenge is partitioned into a first part (C1) and a second part (C2). The challenge may be partitioned as follows. First, the length of second part C2, L(C2), may be determined by performing the following operation: L(C2)=L(ID|P|C) MOD 64. For example, if the length, in octets, of ID|P|C is one hundred, then the length, in octets, of C2 is thirty-six. From L(C2), the length in octets of the first part, L(C1), may be determined, for example, by performing the following operation: L(C2)=L(C)−L(C2). In the previous example, L(C1)=64.

In Act 604, an authentication protocol identifier (e.g., an EAP-ID), a user credential (e.g., a password) and the first part of the challenge are concatenated together (in the order listed in this sentence) to produce a hash function input sequence, S'=ID|P|C1. An example of such a hash function input sequence is illustrated by hash function input sequence 1002 in FIG. 10.

In one or more embodiments of the invention, the hash function initiated by method 600 and completed in method 800 is an MD5-based hash function. In such embodiments, unlike known MD5-based algorithms, method 600 does not include adding an appendage, for example, appendage 317 of FIG. 3 to the message to be hashed, S'. As will be described in more detail below in relation to method 800, later during the performance of method 400, this appendage may be added to the second part of the challenge, C2, by the tunnel server to complete the hash function. As described above, an MD5-based hash function involves performing multiple iterations on sixty-four octet sequences of an input sequence. The appendage has a minimum length of nine octets. Thus, if L(C2)≧fifty-six octets, then the addition of the appendage causes the length of the input sequence to exceed sixty-four octets. Accordingly, octets of zeroes are added to produce an input sequence having a length of one hundred twenty-eight octets, necessitating that the tunnel server perform two iterations of the hash function, which are the last two iterations of the hashing function. If L(C2) <fifty-six octets, then the addition of the appendage does not exceed sixty-four octets, and the tunnel server performs only the last iteration of the hash function.

Accordingly, in Act 606, all but the last one or two iterations of the hash function may be performed on the hash function input sequence to produce the preliminary hash. For example, if the hash function is an MD5-based hash function, and L(C2)≧fifty-six octets, Act 606 may perform all but the last two iterations of the hash function. If the hash function is an MD5-based hash function, and If L(C2)<fifty-six octets, Act 606 may perform all but the last iteration of the hash function Such hash function may be any of a variety of hash functions, and may be any of a variety of types of hash functions, for example, a one-way hash function. A one-way hash function is a hash function which is cryptographically difficult to invert. In other words, if the hash function input sequence=i, the hash value=h, and the hash function=$f(i)$ such that h=$f(i)$, then it is infeasible to determine i given h One-way hash functions often are used to generate digital signatures. An MD5-based hash function is an example of a one-way hash-function.

Returning to method 400, in Act 408, a second communication is transmitted from the second network device on which the client resides to the tunnel server on the first network device. The second communication includes the preliminary hash value. This second communication also may include an indication of a length of a user credential, for example, a length of a user password. This indication may indicate the length in octets of the user credential, for example, the length in octets of a user password, L(P). This preliminary hash value may serve as the client's response to the challenge.

Figure 7:
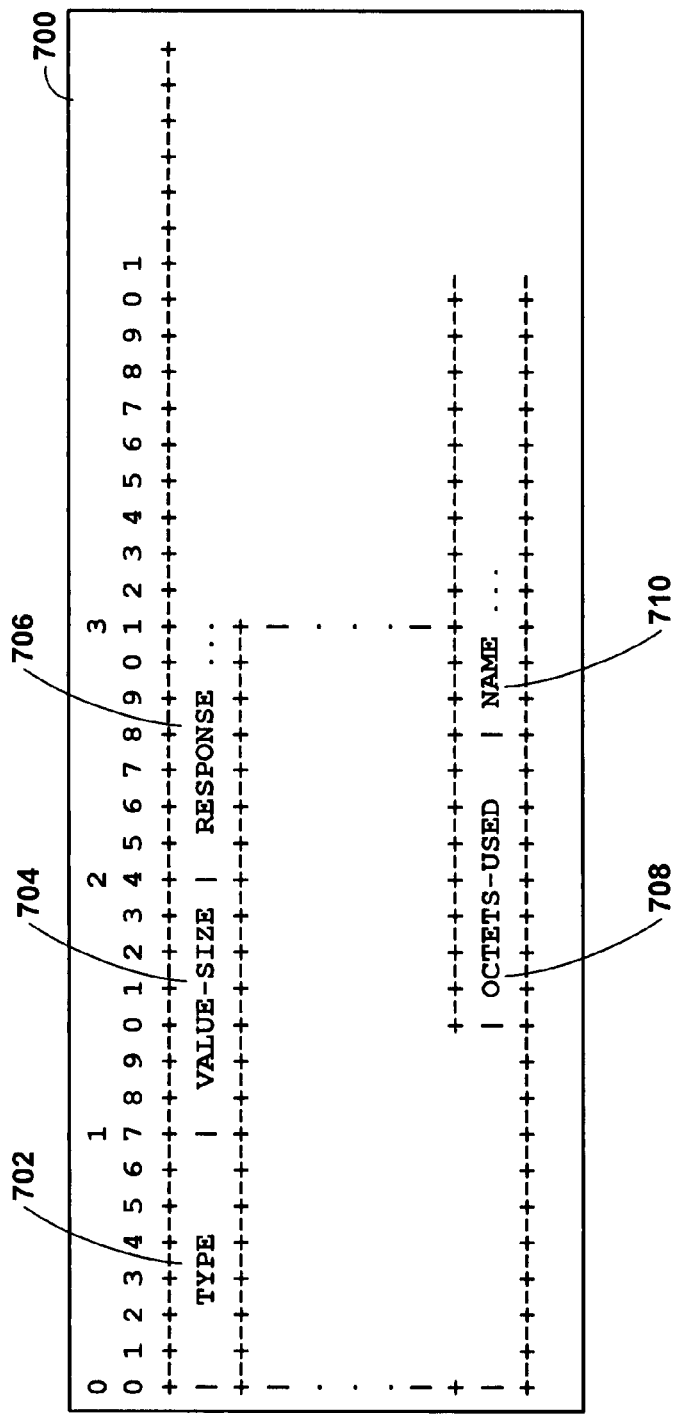
FIG. 7 is a block diagram illustrating an example of a data structure of a payload of a communication, including a response, transmitted from a client to a tunnel server in accordance with one or more embodiments of the invention.

FIG. 7 diagrammatically illustrates an example of a payload 700 of the second communication transmitted from the second network device to the first device. It should be appreciated that payload 700 does not include any header information that may be included in the second communication. Type field 702 may have a length of one octet and may be set to the value of a type of authentication protocol, for example, a protocol for implementing method 400. The tunnel server may use field 702 to determine to implement a protocol in accordance with method 400, as opposed to known protocols CHAP or MDC. Value size field 704 may have a length of one octet and may indicate the length of the response field 706. Response field 706 may include the preliminary hash value. The octets-used field 708 may have a length of one octet and may indicate the length of a user credential (e.g., a password) with which the client responds to the challenge. The name field 710 may be used to identify the client or may be used for other purposes.

Returning to method 400, in Act 410, the tunnel server generates a final hash value by completing the hash function, for example, as described below in more detail in relation to method 800. In one or more embodiments of the invention, the final hash value resulting from performance of Act 410 is equal to a hash value that would result if a the complete hash function were performed on the entire challenge by the client itself, for example, in accordance with known hashing functions such as MD5.

Figure 8:
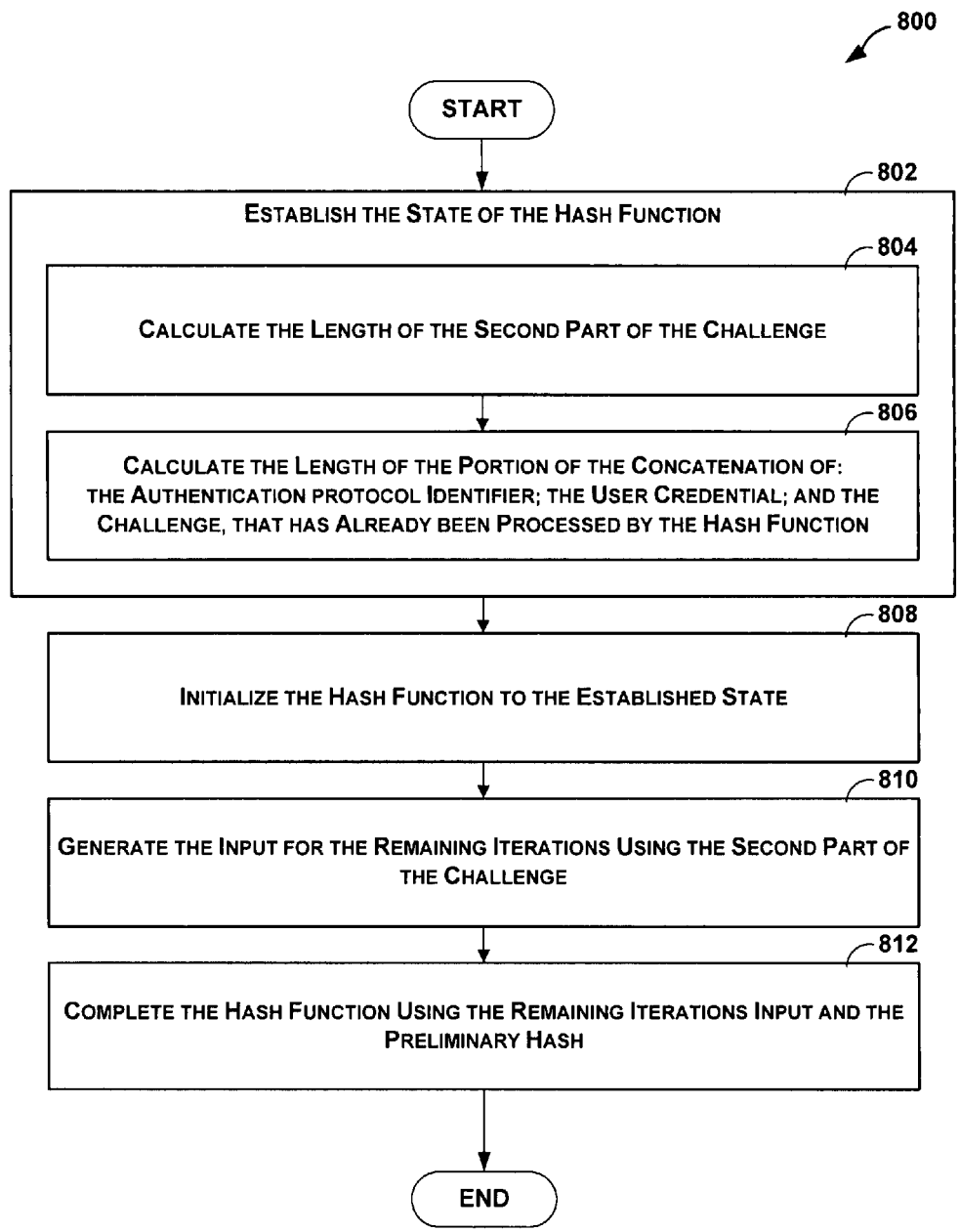
FIG. 8 is a flow chart illustrating an example of a method of generating a final hash value on a tunnel server in accordance with one or more embodiments of the invention.

FIG. 8 is a flow chart illustrating an example of a method 800 of completing a preliminary hash value on a tunnel server.

In Act 802, the tunnel server establishes the current state of the hash function. For example, if the hash function is an MD5-based hash function, the state of the algorithm after each iteration includes: a count of the number of octets already processed by the hash function; and the value of vector V. The count state may be computed based on the length in octets of the user credential (e.g., password) included in the second communication. The vector V may be the preliminary hash value, R'.

Act 802 may include Act 804 to calculate the length of the second part of the challenge, L(C2). For example, if the challenge is an MD5-based challenge, Act 604 may include performing the following operation: L(C2)=(L(ID)+L(P)+L(C)) MOD 64. The values of L(ID) and L(C) are known by the tunnel server because the tunnel server transmitted the challenge and protocol ID to the client in the first communication. L(P) is determined from the second communication.

In Act 806, also within Act 802, the length of the portion of the concatenation of the authentication protocol identifier; the user credential; and the challenge, that has already been processed by the hash function, may be determined. For example, if the hash function is an MD5-based hash function, the length of such portion of the concatenation may be determined by the following operation: L(S')=(L(ID)+L(P)+L(C))−L(C2).

In a following Act 808, the hash function may be initialized to the state established in Act 802.

In Act 810, the input sequence for the remaining one or two iterations of the hash function may be generated using the second part of the challenge. For example, if the hash function is an MD5-based hash function, then Act 810 may include appending (in the following order) the following appendage to the second part of the challenge: a hex 80 octet, padding octets and an eight-octet message length. For example, the remaining iterations input sequence may be input sequence 1100 illustrated below in relation to FIG. 9.

In some embodiments, for example, when the hash function is an MD5-based hash function, the number of remaining iterations depends on the length in octets of the second part of the challenge, L(C2). As described above in relation to method 600, if L(C2)≧fifty-six octets, then the addition of the appendage produces an input sequence having a length exceeding sixty-four octets, and the number of remaining iterations is two. If L(C2)<fifty-six octets, then the addition of the appendage produces an input sequence having a length that does not exceed sixty-four octets, and the number of remaining iterations is one.

In Act 812, the hash function may be completed using the remaining iterations input sequence and the preliminary hash value. For example, if the hash function is an MD5-based hash function, then the final hash value resulting from the completion of the hash function is R=F(R', M[n]), where M[n]=the remaining iterations input sequence.

Returning to method 400, in a following Act 412, the user may be authenticated based on the final hash value. For example, the first network device may include an authentication server for authenticating the user, or the final hash value may be transmitted to an authentication server on a separate network device.

If the authentication server resides on the first network device, the authentication server may perform authentication by generating another preliminary hash value using the credential, for example, using the same technique as described above in relation to Act 406, and comparing this other preliminary hash value to the preliminary hash value received from the client. Alternatively, the authentication server may perform the entire hash function and compare the resulting final hash value to the final hash value resulting from Act 410. It should be appreciated that the tunnel server and the authentication server may be integrated as a single logical component on the first network device.

In one or more embodiments of the invention, if the final hash value is sent to the authentication server, such final hash value is the same hash value that would be sent to the authentication server if the client itself had performed the entire hash function on the challenge.

Methods 400, 600 and 800 may include additional acts, and are merely illustrative embodiments of a method of authenticating a user on a network by splitting performance of a hashing function between a client and a tunnel server. Such illustrative embodiments are not intended to limit the scope of the invention. Any of numerous other implementations for authenticating a user by splitting performance of a hashing function between a client and a tunnel server, for example, variations of methods 400, 500 and 600 are possible and are intended to fall within the scope of the invention.

Methods 400, 500 and 600, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java™, Visual Basic, C, C#, C++, Fortran, Pascal, Eiffel, Basic, COBOL, etc., or any of a variety of combinations thereof. The computer-readable medium on which such instructions are stored may reside on one or more of the components of system 900 described below, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIGS. 12 and 13, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Figure 9:
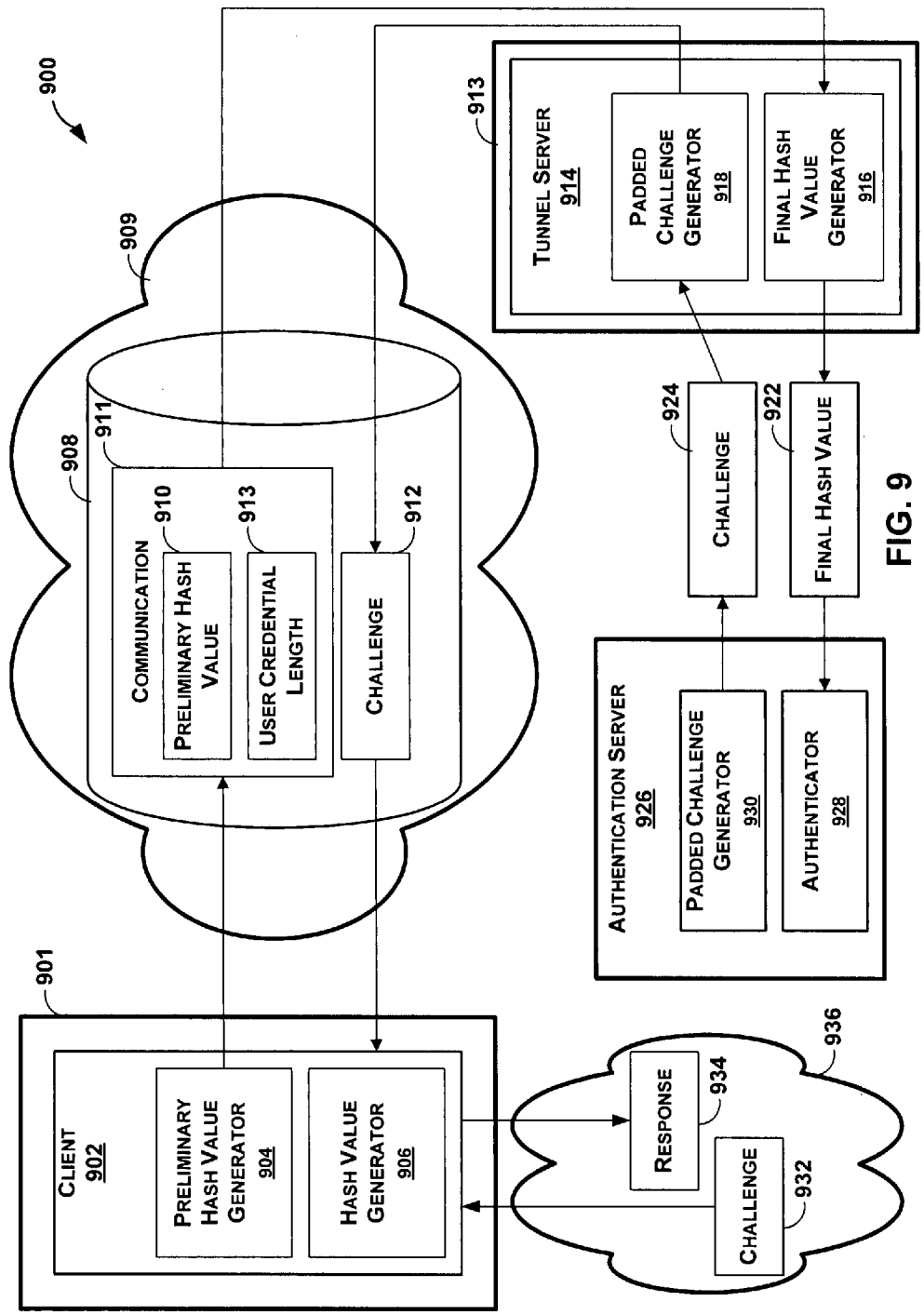
FIG. 9 is a block diagram illustrating an example of a system for authenticating a user in accordance with one or more embodiments of the invention.

FIG. 9 is a block diagram illustrating an example of a 900 for authenticating a user in accordance with one or more embodiments of the invention.

System 900 may include client 902 residing on a second network device 901, network 909, network 936, tunnel server 914 residing on a first network device 913, and authentication server 926 which may reside on first network device 913 or another network device. Client 902 may be configured to receive challenges, for example, challenge 932, outside of a network tunnel across a network 936. Further, client 902 may be configured to transmit responses, for example, response 934 outside of a tunnel across network 936. The client 902 also may be configured to receive a challenge 912 (e.g. a padded challenge as described above in relation to Act 402 of method 400) from tunnel server 914 and to generate and transmit a preliminary hash value 910 within a tunnel 908 across network 909 to tunnel server 914, for example, in accordance with Acts 404 and 406 and method 600. The preliminary hash 910 may be transmitted within a communication 911 (e.g., communication 500), which also may include a user credential length 913 (e.g. password length).

The client 902 may include a preliminary hash value generator 904 to receive an initialization vector and a hash function input sequence, and to generate preliminary hash value 910, for example, as described above in relation to Act 406 and method 600. Client 902 also may include hash value generator 906, which may be configured to generate a hash value in accordance with Acts 206 and 208. For example, hash value generator 906 may be configured to operate similar to or the same as hash value generator 104 described above in relation to FIGS. 1 and 3. Preliminary hash value generator 904 and hash value generator may be a same component configured (e.g., programmed or hard-wired) to generate final hash values or preliminary hash values depending on the authentication protocol being used for a particular session. For example, the client may be configured to determine the authentication protocol for a session based on an authentication protocol identifier received in communication 932 or 911.

The tunnel server 914 may be configured to generate a challenge 912, which may be a challenge padded as described above in relation to Act 402 of method 400, and to transmit it through tunnel 908 across network 909 to the client 902, for example, as described above in relation to Acts 402 and 404 of FIG. 4. The tunnel server 914 may include a padded challenge generator 918 to generate the challenge of 912. Padded challenge generator also may be configured to generate non-padded challenges in accordance with know authentication protocols. The tunnel server 914 also may be configured to receive preliminary hash value 910 transmitted from the client through the tunnel 908 across network 909, and to complete the hash function to produce the final hash value 922, for example, as described above in relation to Act 410 of method 400 and method 800. The tunnel server 914 may include a final hash value generator 916 to generate the final hash value 922.

If the authentication server 926 does not reside on network device 913, the tunnel server 914 may be configured to transmit the final hash value 922 to the authentication server 926 so that the authentication server 926 may perform the authentication, for example, as described above in relation to Act 412 of method 400.

As described above, in one or more embodiments, the challenge 912 is not generated by the tunnel server 914, but is generated by the authentication server 926 residing on a separate network device. In such case, the authentication server 926 may include a padded challenge generator 930 that generates challenge 924 (which may be a padded challenge), which is forwarded through the tunnel 908 as challenge 912 by the tunnel server 914.

Figure 10:
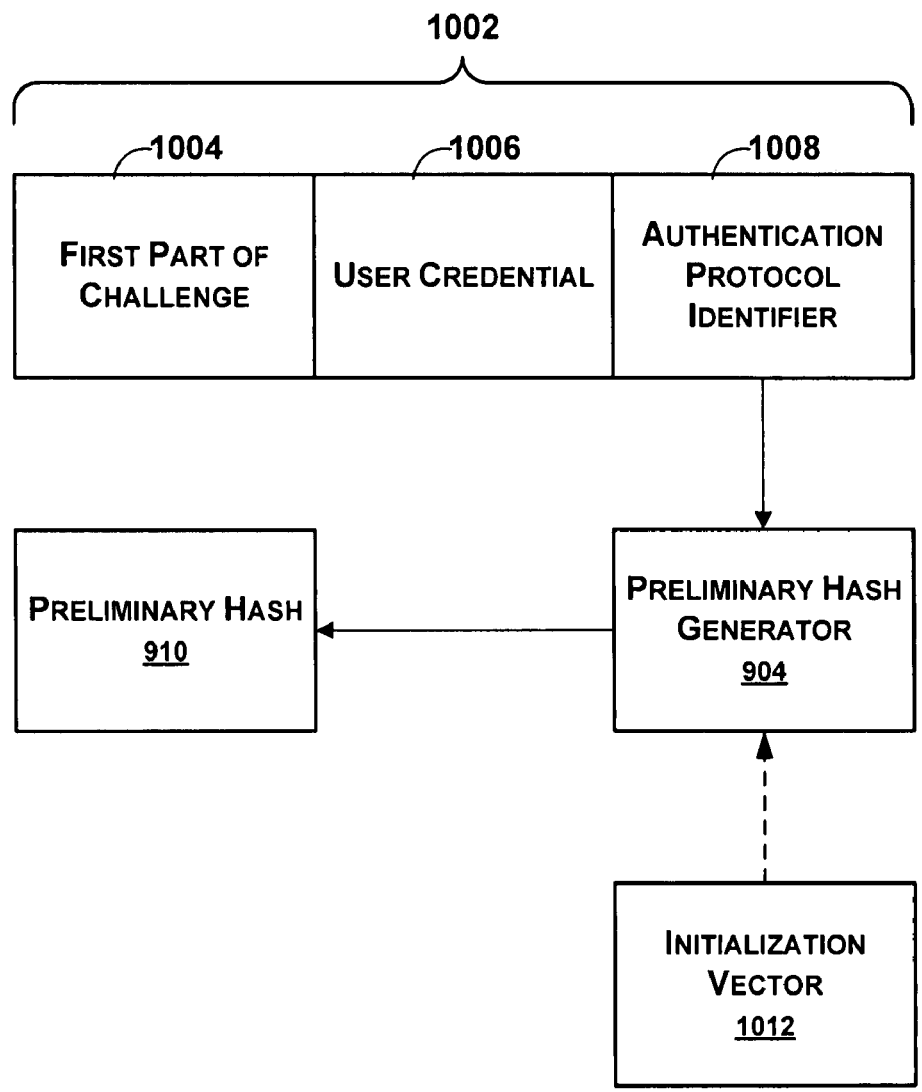
FIG. 10 is an information flow diagram illustrating an example of a preliminary hash generator generating a preliminary hash value in accordance with one or more embodiments of the invention.

FIG. 10 is an information flow diagram illustrating an example of a preliminary hash value generator 906 generating a preliminary hash value 910.

The preliminary hash value generator 906 may be configured to receive the initialization vector 1012 and a hash function input sequence 1002. As described above in relation to Acts 602 and 604 of method 600, the hash function input sequence 1002 may include authentication protocol identifier 1008, user credential 1006, and a first part of the challenge 1004. The hash function input sequence 1002 may be configured such that the preliminary hash value generator 906 receives the information in the order presented in the previous sentence, specifically: 1008, 1006, 1004. The preliminary hash value generator 906 then may generate the preliminary hash value 910 as described above in relation to Act 606 of method 600.

Figure 11:
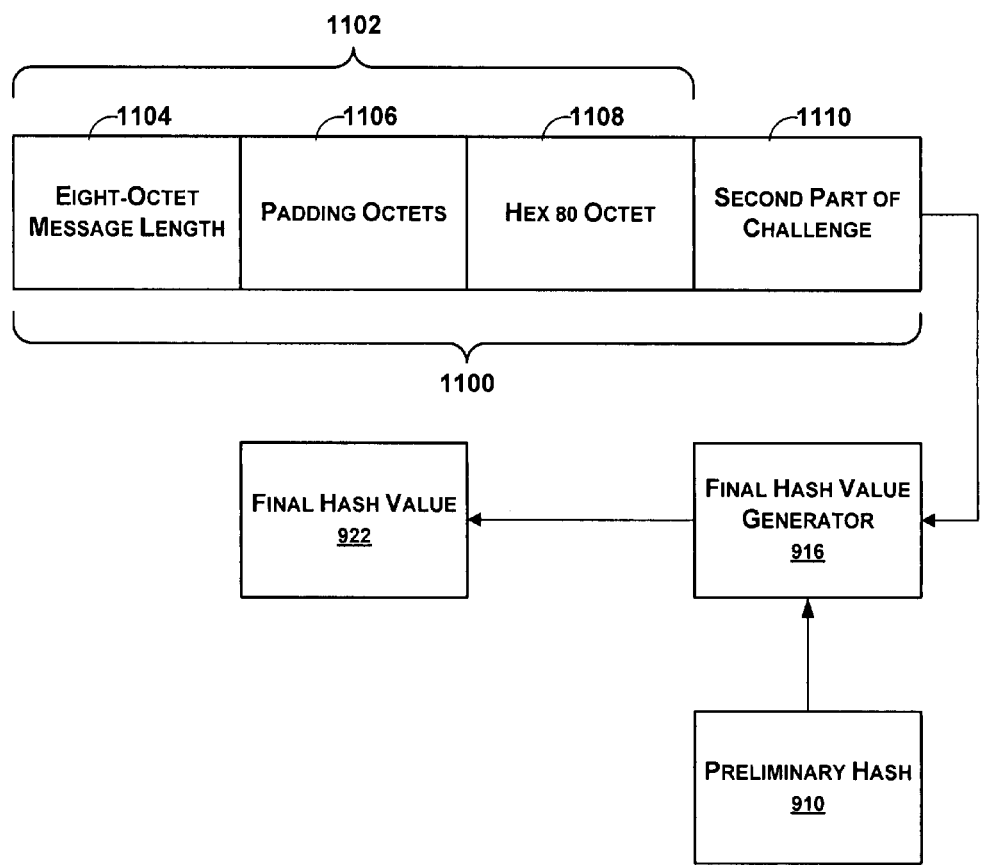
FIG. 11 is an information flow diagram illustrating an example of a final hash generator generating a final hash value based on a preliminary hash value and a second part of a challenge in accordance with one or more embodiments of the invention.

FIG. 11 is an information flow diagram illustrating an example of a final hash value generator 916 generating a final hash value 922 based on a preliminary hash value 910 and a second part of a challenge 1110.

The final hash value generator 916 may be configured to receive the preliminary hash value 910, generated by the preliminary hash value generator 906, and the remaining iterations input sequence 1100, and produce final hash value 922. The final hash value generator 916 may be initialized to the current state of the hashing function, as described above in relation to Act 808 of method 800. The preliminary hash 910 may serve as current vector, V, of the hash function.

The remaining iterations input sequence 1100 may include appendage 1102 and the second part of the challenge 1110. As described above, appendage 1102 may include an eight-octet message length field 1104, padding octets 1106, and a hex 80 octet 1108. The remaining iterations input sequence 1100 may be configured such that the final hash generator receives the information included therein in the following order: 1110, 1108, 1106, 1104.

Client 902, tunnel server 914, authentication server 926 and components thereof, including preliminary hash value generator 904, hash value generator 906, final hash value generator 916 and padded challenge generator 918 may be implemented using software (e.g., code in C, C#, C++, Java, or a combination thereof), hardware (e.g., one or more application-specific integrated circuits), firmware (e.g., electrically-programmed memory) or any combination thereof. For client 902, tunnel server 914 and authentication server 926, one or more of the components of each may reside on a single system, or one or more components may reside on separate, discrete systems. Further, each component may be distributed across multiple systems, and one or more of the systems may be interconnected.

Further, on each of the one or more systems that include one or more of the components, each of the components may reside in one or more locations on the system. For example, different portions of the components may reside in different areas of memory (e.g., RAM, ROM, disk, etc.) on the system, permanently or temporarily. Each of such one or more systems may include, among other components, a plurality of known components such as one or more processors, a memory system, a disk storage system, one or more network interfaces, and one or more busses or other internal communication links interconnecting the various components. Each of client 902, tunnel server 914 and authentication server 926 may be implemented on a computer system described below in relation to FIGS. 12 and 13.

System 900 is merely an illustrative embodiment of a system for authenticating a user by splitting performance of a hashing function between a client and a tunnel server. Such an illustrative embodiment is not intended to limit the scope of the invention, as any of numerous other implementations of authenticating a user by splitting performance of a hashing function between a client and a tunnel server, for example, variations of system 900, are possible and are intended to fall within the scope of the invention.

Various embodiments according to the invention may be implemented on one or more computer systems. These computer systems may be, for example, general-purpose computers such as those based on Intel PENTIUM™-type processors, Motorola PowerPC™, Sun UltraSPARC™, Hewlet-Packard PA-RISC™ processors, or any other type of processor. It should be appreciated that one or more of any type of computer system may be used to authenticate a user by splitting performance of a hashing function between a client and a tunnel server according to various embodiments of the invention. Further, the software design system may be located on a single computer or may be distributed among a plurality of computers attached by a communications network.

A general-purpose computer system according to one embodiment of the invention is configured to authenticate a user by splitting performance of a hashing function between a client and a tunnel server. It should be appreciated that the system may perform other functions, and the invention is not limited to having any particular function or set of functions. As used herein, a "set" of items may include one or more of such items.

Figure 12:
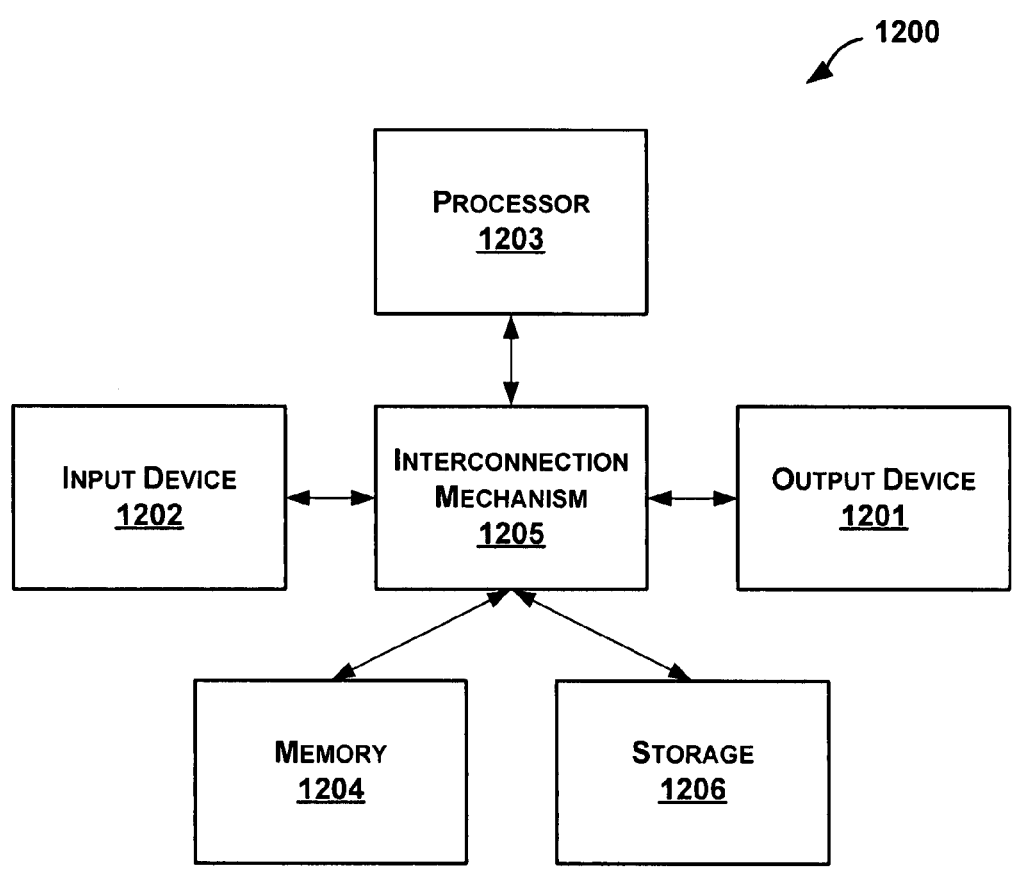
FIG. 12 is a block diagram illustrating an example of a general-purpose computer system that can be used to implement one or more embodiments of the invention.

For example, various aspects of the invention may be implemented as specialized software executing in a general-purpose computer system 1200 such as that shown in FIG. 12. The computer system 1200 may include a processor 1203 connected to one or more memory devices 1204, such as a disk drive, memory, or other device for storing data. Memory 1204 is typically used for storing programs and data during operation of the computer system 1200. Components of computer system 1200 may be coupled by an interconnection mechanism 1205, which may include one or more busses (e.g., between components that are integrated within a same machine) and/or a network (e.g., between components that reside on separate discrete machines). The interconnection mechanism 1205 enables communications (e.g., data, instructions) to be exchanged between system components of system 1200. Computer system 1200 also includes one or more input devices 1202, for example, a keyboard, mouse, trackball, microphone, touch screen, and one or more output devices 1201, for example, a printing device, display screen, speaker. In addition, computer system 1200 may contain one or more interfaces (not shown) that connect computer system 1200 to a communication network (in addition or as an alternative to the interconnection mechanism 1205).

Figure 13:
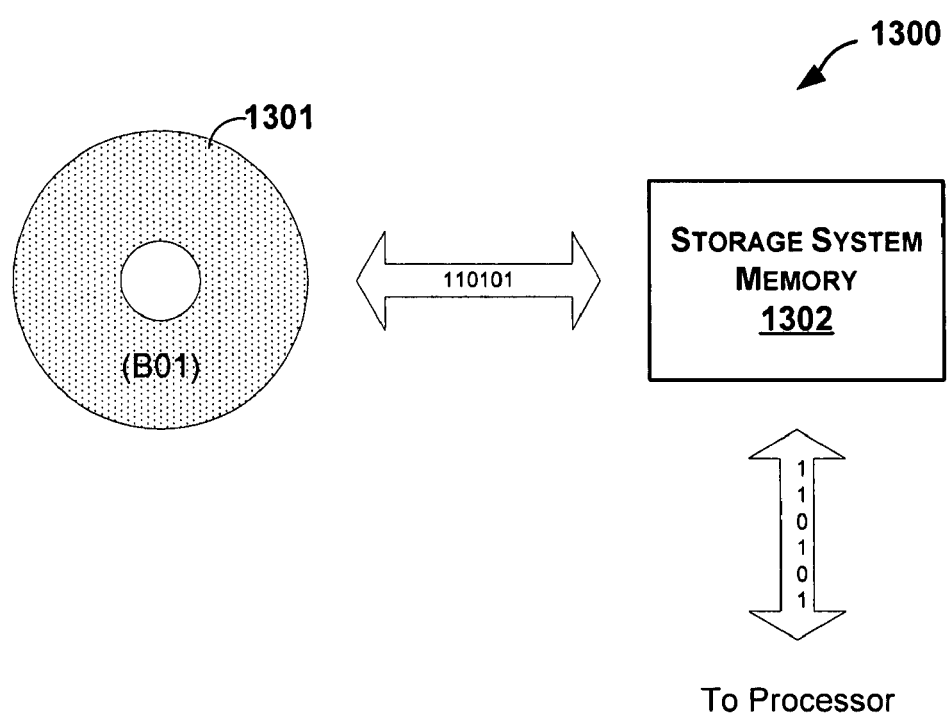
FIG. 13 is a block diagram illustrating an example of a memory sub-system of a general-purpose computer system that can be used to implement one or more embodiments of the invention.

The storage system 1206, shown in greater detail in FIG. 13, typically includes a computer-readable and-writeable nonvolatile recording medium 1301 in which signals are stored that define a program to be executed by the processor or information stored on or in the medium 1301 to be processed by the program. The medium may, for example, be a disk or flash memory. Typically, in operation, the processor causes data to be read from the nonvolatile recording medium 1301 into another memory 1302 that allows for faster access to the information by the processor than does the medium 1301. This memory 1302 is typically a volatile, random access memory such as a dynamic random access memory (DRAM) or static memory (SRAM). It may be located in storage system 1206, as shown, or in memory system 1204, not shown. The processor 1203 generally manipulates the data within the integrated circuit memory 1204, 1302 and then copies the data to the medium 1301 after processing is completed. A variety of mechanisms are known for managing data movement between the medium 1301 and the integrated circuit memory element 1204, 1302, and the invention is not limited thereto. The invention is not limited to a particular memory system 1204 or storage system 1206.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1200 is shown by way of example as one type of computer system upon which various aspects of the invention may be practiced, it should be appreciated that aspects of the invention are not limited to being implemented on the computer system as shown in FIG. 12. Various aspects of the invention may be practiced on one or more computers having a different architecture or components that that shown in FIG. 12.

Computer system 1200 may be a general-purpose computer system that is programmable using a high-level computer programming language. Computer system 1200 may be also implemented using specially programmed, special purpose hardware. In computer system 1200, processor 1203 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of at least partially authenticating a user on a communications network, the method comprising acts of:
   (A) receiving, with a second network device, a first communication from a first network device, wherein the first communication includes a challenge;
   (B) in response to receiving the challenge, generating, with the second network device, a preliminary hash value by performing only a first part of a hash function on a first part of the challenge when the second network device received the challenge via a secure network tunnel between the first network device and the second network device, wherein the first part of the challenge is less than the complete challenge;
   (C) transmitting a second communication from the second network device to the first network device via the secure network tunnel, the second communication including the preliminary hash value;
   (D) applying, with the first network device, a remaining part of the hash function to the preliminary hash value, thereby generating a final hash value; and
   (F) authenticating the user based on the final hash value.

2. The method of claim 1, wherein act (B) comprises: performing only part of a Message Digest 5-based encryption function.

3. The method of claim 2, wherein act (B) comprises:
   (1) generating an input sequence to the Message Digest 5-based encryption function by concatenating information to be communicated from the second network device to the first network device; and
   (2) inputting the input sequence into the Message Digest 5-based encryption function without previously adding an appendage of information to the input sequence.

4. The method of claim 1, wherein a complete performance of the hash function comprises performing a first number of iterations, wherein act (B) comprises performing a second number of iterations that is less than the first number of iterations, and wherein act (D) comprises performing a third number of iterations equal to the first number minus the second number, resulting in the complete performance of the hash function.

5. The method of claim 1, wherein act (D) includes applying the remaining part of the hash function using a second part of the challenge, wherein the first part and the second part form the complete challenge.

6. The method of claim 1, wherein act (B) includes generating the preliminary hash value based, at least in part, on the first part of the challenge and a user credential.

7. The method of claim 6, wherein act (B) includes dividing the challenge into the first part and a second part, and the method further comprises:
   configuring the second communication to include an indication of a length in bits of the user credential, and
   wherein act (D) includes applying the remaining part of the hash function based, at least in part, on the second part of the challenge and the length of the user credential.

8. The method of claim 7, wherein act (D) includes:
   (1) determining a state of the hash function based, at least in part, on the length of the user credential; and
   (2) applying the remaining part of the hash function based, at least in part, on the determined state.

9. The method of claim 7, wherein act (D) further comprises:
   (1) determining a length of the second part based, at least in part, on a length of the challenge and the length of the user credential; and
   (2) applying the remaining part of the hash function based, at least in part, on the determined length of the second part.

10. The method of claim 1, further comprising an act of: generating the challenge on the first network device, including generating a portion of the challenge having a length equal to a desired amount of entropy for the challenge, and appending bits to the portion of the challenge to produce the challenge.

11. The method of claim 10, wherein generating the challenge includes appending sixty-three bits to the portion.

12. The method of claim 1, the method further comprising an act of:
   generating the challenge on the first network device such that the challenge includes a plurality of sequences of bits, wherein each sequence of bits in the plurality of sequences of bits includes at least one non-zero bit.

13. The method of claim 12, wherein each sequence of bits in the plurality of sequences of bits is an octet of bits.

14. The method of claim 1, further comprising an act of: generating the challenge on the first network device, including configuring the challenge to include at least a minimum number of octets of bits.

15. The method of claim 1, wherein act (B) comprises:
   (1) determining a length of a concatenation of an authentication protocol identifier, a user credential and the challenge; and
   (2) dividing the challenge into the first part and a second part based on the determined length.

16. The method of claim 1, wherein the method further comprises an act of:
   transmitting a third communication including the final hash value to a third network device configured to authenticate the user.

17. The method of claim 1, further comprising generating, with the second network device, a complete hash value by performing all of the hash function on the complete challenge when the second network device receives the complete challenge external to the secure network tunnel.

18. A system for at least partially authenticating a user on a communications network, the system comprising:

a first network device that transmits a first communication to a second network device, wherein the first communication includes a challenge;

a second network device that is configured to receive the challenge, to generate a preliminary hash value by performing only a first part of a hash function on a first part of the challenge when the second network device received the challenge via a secure network tunnel between the first network device and the second network device, wherein the first part of the challenge is less than the complete challenge, and to transmit a second communication from the second network device to the first network device via the secure tunnel, the second communication including the preliminary hash value, wherein the first network device is configured to apply a remaining part of the hash function to the preliminary hash value, thereby generating a final hash value; and an authentication device that authenticates the user based on the final hash value.

19. The system of claim 18, wherein the second network device is operative to perform only part of a Message Digest 5-based encryption function.

20. The system of claim 19,
wherein the second network device is operative to generate an input sequence to the Message Digest 5-based encryption function by concatenating information to be communicated from the second network device to the first network device, and is operative to input the input sequence into the Message Digest 5-based encryption function without previously adding an appendage of information to the input sequence.

21. The system of claim 18, wherein a complete performance of the hash function comprises performing a first number of iterations, and the second network device is operative to perform a second number of iterations that is less than the first number of iterations, and wherein the first network device is operative to perform a third number of iterations equal to the first number minus the second number, resulting in a complete performance of the hash function.

22. The system of claim 18, wherein the first network device is operative to apply the remaining part of the hash function using a second part of the challenge, wherein the first part of the challenge and the second part of the challenge form the challenge.

23. The system of claim 18, wherein the first network device is operative to generate the preliminary hash value based, at least in part, on the first part of the challenge and a user credential.

24. The system of claim 23, wherein the second network device is operative to divide the challenge into the first part and a second part, and to configure the second communication to include an indication of a length in bits of the user credential, and the first network device is operative to apply the remaining part of the hash function based, at least in part, on the second part of the challenge and the length of the user credential.

25. The system of claim 24, wherein the first network device is operative to determine a state of the hash function based, at least in part, on the length of the user credential, and to complete the hash function based, at least in part, on the determined length.

26. The system of claim 24, wherein the first network device is operative to determine a length of the second part based, at least in part, on a length of the challenge and the length of the user credential, and to apply the remaining part of the hash function based, at least in part, on the determined length of the second part.

27. The system of claim 18, wherein the first network device is operative to generate a portion of the challenge having a length equal to a desired amount of entropy for the challenge, and to append bits to the portion of the challenge, thereby producing the challenge.

28. The system of claim 27, wherein the first network device is operative to append sixty-three bits to the portion.

29. The system of claim 18, wherein the first network device is operative to generate the challenge such that the challenge includes a plurality of sequences of bits, wherein each sequence of bits in the plurality of sequences of bits includes at least one non-zero bit.

30. The system of claim 29, wherein each sequence of bits in the plurality of sequences of bits is an octet of bits.

31. The system of claim 18, wherein the first network device is operative to generate the challenge such that the challenge includes at least a minimum length of bits.

32. The system of claim 18, wherein the second network device is operative to determine a length of a concatenation of an authentication protocol identifier, a user credential and the challenge, and to divide the challenge into the first part and a second part based on the determined length.

33. The system of claim 18, wherein the authentication device is integrated into the first network device.

34. The system of claim 18, wherein the first network device is operative to transmit a third communication including the final hash value to the authentication device.

35. The system of claim 18, wherein the second network device generates a complete hash value by performing all of the hash function on the complete challenge when the second network device receives the complete challenge external to the secure network tunnel.

36. The system of claim 18, wherein the second device is configured to generate a complete hash value by applying all of the hash function on the challenge when the second network device received the challenge external to the secure network tunnel.

37. A system for at least partially authenticating a user on a communications network, the system comprising:
a first communication device operative to transmit a first communication to a second network device, wherein the first communication includes a challenge; and
a second network device operative to receive the challenge and to transmit a second communication from the second network device to the first network device via secure network tunnel between the first network device and the second network device, the second communication including a preliminary hash value,
wherein the second network device includes means for generating a preliminary hash value by performing only a first part of a hash function on a first part of the challenge when the second network device received the challenge via the secure network tunnel, wherein the first part of the challenge is less than the complete challenge, and
wherein the first network device includes means for applying a remaining part of the hash function to the preliminary hash value, thereby producing a final hash value; and
an authentication device that comprises means for authenticating the user based on the final hash value.

38. A computer-readable medium having computer-readable signals stored thereon that define instructions that, as a result of being executed by one or more processors of a second network device, cause the one or more processors to:
- (A) receive a first communication from a first network device that is configured to authenticate a user of the second network device based on a final hash value generated by applying a remaining part of a hash function to a preliminary hash value, wherein the first communication includes a challenge;
- (B) generate, in response to receiving the challenge, the preliminary hash value by performing only a first part of the hash function on a first part of the challenge when the second network device received the challenge via a secure network tunnel between the first network device and the second network device, wherein the first part of the challenge is less than the complete challenge; and
- (C) transmit a second communication to the first network device via the secure network tunnel, the second communication including the preliminary hash value.

39. A method of at least partially authenticating a user on a communications network, the method comprising acts of:
- (A) transmitting a first communication from a first network device to a second network device, wherein the first communication includes a challenge;
- (B) receiving a second communication from the second network device via a secure network tunnel between the first network device and the second network device, the second communication including a preliminary hash value resulting from performance of only a first part of a hash function on a first part of the challenge when the second network device received the challenge via the secure network tunnel, wherein the first part of the challenge is less than the complete challenge;
- (C) applying, with the first network device, a remaining part of the hash function to the preliminary hash value, thereby generating a final hash value; and
- (D) authenticating the user based on the final hash value.

40. The method of claim 39, wherein the preliminary hash value is a result of partial performance of an Message Digest 5-based encryption function on the first part of the challenge, and wherein act (C) comprises:
completing the Message Digest 5-based encryption function.

41. The method of claim 39, wherein complete performance of the hash function involves performing a first number of iterations, and wherein the preliminary hash value resulted from performance of a second number of iterations that is less than the first number of iterations, and wherein act (C) includes performing a third number of iterations equal to the first number minus the second number, resulting in a complete performance of the hash function.

42. The method of claim 39, wherein act (C) includes applying the remaining part of the hash function using a second part of the challenge, wherein the first part of the challenge and the second part of the challenge form the complete challenge.

43. The method of claim 39, wherein the challenge includes two parts: the first part and a second part, and the preliminary hash value is based, at least in part, on the first part of the challenge and a user credential, and the second communication includes an indication of a length in bits of the user credential, and
wherein act (C) includes applying the remaining part of the hash function based, at least in part, on the second part of the challenge and the length of the user credential.

44. The method of claim 43, wherein act (C) includes:
- (1) determining a state of the hash function based, at least in part, on the length of the user credential; and
- (2) applying the remaining part of the hash function based, at least in part, on the determined state.

45. The method of claim 43, wherein act (C) further comprises:
- (1) determining a length of the second part of the challenge based, at least in part, on a length of the challenge and the length of the user credential; and
- (2) applying the remaining part of the hash function based, at least in part, on the determined length of the second part.

46. The method of claim 39, further comprising an act of:
generating the challenge on the first network device, wherein generating the challenge comprises:
generating a portion of the challenge having a length equal to a desired amount of entropy for the challenge, and
appending bits to the portion of the challenge to produce the challenge.

47. The method of claim 46, wherein appending bits comprises appending sixty-three bits to the challenge.

48. The method of claim 39, the method further comprising an act of:
generating the challenge on the first network device such that the challenge includes a plurality of sequences of bits, wherein each sequence of bits in the plurality of sequences of bits includes at least one non-zero bit.

49. The method of claim 48, wherein each sequence of bits in the plurality of seciuences of bits is an octet of bits.

50. The method of claim 39, further comprising an act of:
generating the challenge on the first network device, wherein generating the challenge comprises configuring the challenge to include at least a minimum length of bits.

51. The method of claim 39,
wherein the second network device is configured to generate a complete hash value by performing all of the hash function on the complete challenge when the second network device receives the complete challenge external to the secure network tunnel.

52. A tunnel server residing on a first network device of a communications network for at least partially authenticating a user on the communications network, the tunnel server comprising:
a challenge generator to generate a challenge that is transmitted from the first network device to a second network device;
a final hash value generator to receive via a secure network tunnel between the first network device and the second network device a preliminary hash value from the second network device, the preliminary hash value resulting from performance of only a first part of a hash function on a first part of the challenge when the second device received the challenge via the secure network tunnel, wherein the first part of the challenge is less than the complete challenge,
wherein the final hash value generator is operative to apply a remaining part of the hash function device to the preliminary hash value, thereby generating a final hash value; and
an authenticator that authenticates the user based on the final hash value.

53. The tunnel server of claim 52, wherein the complete performance of the hash function involves performing a first number of iterations, and the preliminary hash value is the result of performance of a second number of iterations that is less than the first number of iterations, and wherein the final hash value generator is operative to perform a third number of iterations equal to the first number minus the second number, resulting in a complete performance of the hash function.

54. The tunnel server of claim 52, wherein the final hash value generator is operative to apply the remaining part of the hash function using a second part of the challenge, wherein the first part of the challenge and the second part of the challenge form the complete challenge.

55. The tunnel server of claim 52, wherein the challenge includes the first part and a second part, and the second communication includes an indication of a length in bits of a user credential, and wherein the final hash value generator is operative to apply the remaining part of the hash function based, at least in part, on the second part of the challenge and the length of the user credential.

56. The tunnel server of claim 55, wherein the final hash value generator is operative to determine a state of the hash function based, at least in part, on the length of the user credential, and to apply the remaining part of the hash function based, at least in part, on the determined length.

57. The tunnel server of claim 55, wherein the final hash value generator is operative to determine a length of the second part of the challenge based, at least in part, on a length of the challenge and the length of the user credential, and to apply the remaining part of the hash function based, at least in art on the determined length of the second part of the challenge.

58. The tunnel server of claim 52, wherein the challenge generator is operative to generate the challenge, to generate a portion of the challenge having a length equal to a desired amount of entropy for the challenge, and to append bits to the portion of the challenge to produce the challenge.

59. The tunnel server of claim 58, wherein the challenge generator is operative to append sixty-three bits to the portion.

60. The tunnel server of claim 52, wherein the challenge generator is operative to generate the challenge such that the challenge includes a plurality of sequences of bits, wherein each sequence of bits in the plurality of sequences of bits includes at least one non-zero bit.

61. The tunnel server of claim 60, wherein each sequence of bits in the plurality of sequences of bits is an octet of bits.

62. The tunnel server of claim 52, wherein the challenge generator is operative to generate the challenge such that the challenge includes at least a minimum length of bits.

63. The tunnel server of claim 52, wherein the tunnel server is operative to control transmission of a third communication including the final hash value to a third network device configured to authenticate the user.

64. The tunnel server of claim 52, wherein the second network device is configured to generate a complete hash value by performing all of the hash function on the complete challenge when the second network device receives the complete challenge external to the secure network tunnel.

65. A tunnel server residing on a first network device of a communications network for at least partially authenticating a user on the communications network, the tunnel server comprising:
    a challenge generator to generate a challenge that is transmitted from the first network device to a second network device, wherein the tunnel server is operative to receive a preliminary hash value from the second network device via a secure network tunnel between the first network device and the second network device, the preliminary hash value resulting from performance of only a first part of a hash function on a first part of the challenge when the second network device received the challenge via the secure network tunnel, wherein the first part is less than the complete challenge;
    means for applying a remaining part of the hash function to the preliminary hash value, thereby generating a final hash value; and
    means for authenticating the user based on the final hash value.

66. A computer-readable medium having computer-readable signals stored thereon that define instructions that, as a result of being executed by a first network device, control the first network device to perform a method of at least partially authenticating a user on a communications network, the method comprising acts of:
    (A) transmitting a first communication from the first network device to a second network device, wherein the first communication includes a challenge;
    (B) receiving a second communication from the second network device to the first network device via a secure network tunnel between the first network device and the second network device, the second communication including a preliminary hash value generated by performing only a first part of a hash function on a first part of the challenge when the second network device received the challenge via the secure network tunnel, wherein the first part of the challenge is less than the complete challenge; and
    (C) applying a remaining part of the hash function to the preliminary hash value on the first network device, thereby generating a final hash value.

67. A method of at least partially authenticating a user on a communications network in response to a challenge received at a second network device from a first network device, the method comprising acts of:
    receiving a challenge from a first network device that is configured to authenticate a user of the second network device based on a final hash value generated by applying a remaining part of a hash function to a preliminary hash value;
    generating the preliminary hash value by performing only a first part of a hash function on a first part of the challenge when the second network device received the challenge via a secure network tunnel between the first network device and the second network device, wherein the first part of the challenge is less than the complete challenge; and
    transmitting a communication from the second network device to the first network device via the secure network tunnel, the communication including the preliminary hash value.

68. The method of claim 67, wherein generating the preliminary hash value comprises:
    performing only part of a Message Digest 5-based encryption function.

69. The method of claim 68, wherein generating the preliminary hash value comprises:
    (1) generating an input sequence to the Message Digest 5-based encryption function by concatenating information to be communicated from the second network device to the first network device; and
    (2) inputting the input sequence into the Message Digest 5-based encryption function without previously adding an appendage of information to the input sequence.

70. The method of claim 67, wherein the complete performance of the hash function involves performing a first number of iterations, and wherein generating the preliminary hash value comprises performing a second number of iterations that is less than the first number of iterations.

71. The method of claim 67, wherein generating the preliminary hash value comprises generating the preliminary hash value based, at least in part, on the first part of the challenge and a user credential.

72. The method of claim 71, wherein generating the preliminary hash value comprises dividing the challenge into the first part and a second part, and the method further comprises:
configuring the communication to include an indication of a length in bits of the user credential.

73. The method of claim 67, wherein generating the preliminary hash value comprises:
(1) determining a length of a concatenation of an authentication protocol identifier, a user credential and the challenge; and
(2) dividing the challenge into the first part of the challenge and a second part of the challenge based on the determined length.

74. The method of claim 67, further comprising generating, with the second network device, a complete hash value by performing all of the hash function on the complete challenge when the second network device receives the complete challenge external to the secure network tunnel.

75. A client residing on a second network device of a communications network, the client comprising:
an interface that receives a challenge from a first network device that is configured to authenticate a user of the second network device based on a final hash value generated by applying a remaining part of a hash function to a preliminary hash value;
a preliminary hash generator to generate the preliminary hash value by performing only a first part of the hash function on a first part of the challenge when the client received the challenge via a secure network tunnel between the first network device and the second network device, wherein the first part of the challenge is less than the complete challenge,
wherein the second network device is operative to transmit a communication from the second network device to the first network device via the secure network tunnel, the communication including the preliminary hash value.

76. The client of claim 75, wherein the preliminary hash generator is operative to perform only part of a Message Digest 5-based encryption function.

77. The client of claim 76,
wherein the preliminary hash generator is operative to generate an input sequence to the Message Digest 5-based encryption function by concatenating information to be communicated from the second network device to the first network device, and to input the input sequence into the Message Digest 5-based encryption function without previously adding an appendage of information to the input sequence.

78. The client of claim 75, wherein the complete performance of the hash function involves performing a first number of iterations, and
wherein the preliminary hash generator is operative to perform a second number of iterations less than the first number of iterations.

79. The client of claim 75, wherein the preliminary hash generator is operative to generate the preliminary hash value based, at least in part, on the first part of the challenge and a user credential.

80. The client of claim 79, wherein the preliminary hash generator is operative to divide the challenge into the first part and a second part, and to configure the communication to include an indication of a length in bits of the user credential.

81. The client of claim 75, wherein the preliminary hash generator is operative to determine a length of a concatenation of an authentication protocol identifier, a user credential and the challenge, and to divide the challenge into the first part and a second part based on the determined length.

82. The client of claim 75, wherein the client is operative to generate a complete hash value by performing all of the hash function on the complete challenge when the second network device receives the complete challenge external to the secure network tunnel.

83. A client residing on a second network device of a communications network, the client comprising:
means for receiving a challenge from a first network device that is configured to authenticate a user of the second network device based on a final hash value generated by applying a remaining part of a hash function to a preliminary hash value;
means for generating the preliminary hash value by performing only a first part of the hash function on a first part of the challenge when the client received the challenge via a secure network tunnel between the first network device and the second network device, wherein the first part is less than the complete challenge,
wherein the second network device is operative to transmit a communication from the second network device to the first network device via the secure network tunnel, the communication including the preliminary hash value.

84. A computer-readable medium having computer-readable signals stored thereon that define instructions that, as a result of being executed by a second network device, control the second network device to:
receive a challenge from a first network device that is configured to authenticate a user of the second network device based on a final hash value generated by applying a remaining part of a hash function to a preliminary hash value;
generate the preliminary hash value by performing only a first part of the hash function on a first part of the challenge when the second network device received the challenge via a secure network tunnel between the first network device and the second network device, wherein the first part of the challenge is less than the complete challenge; and
transmit a communication from the second network device to the first network device via the secure network tunnel, the second communication including the preliminary hash value.

* * * * *